United States Patent
Fujii

(10) Patent No.: US 10,710,497 B2
(45) Date of Patent: Jul. 14, 2020

(54) LANE CHANGE ASSIST DEVICE FOR A VEHICLE

(71) Applicant: TOYOTA JIDOSHA KABUSHIKI KAISHA, Toyota-shi, Aichi-ken (JP)

(72) Inventor: Shota Fujii, Susono (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 272 days.

(21) Appl. No.: 15/848,107

(22) Filed: Dec. 20, 2017

(65) Prior Publication Data

US 2018/0178713 A1    Jun. 28, 2018

(30) Foreign Application Priority Data

Dec. 26, 2016  (JP) .................................. 2016-251658

(51) Int. Cl.
| | |
|---|---|
| *B60Q 1/34* | (2006.01) |
| *B60W 30/18* | (2012.01) |
| *B60Q 1/40* | (2006.01) |
| *G08G 1/16* | (2006.01) |
| *B60W 30/12* | (2020.01) |
| *B60Q 9/00* | (2006.01) |

(52) U.S. Cl.
CPC .............. *B60Q 1/346* (2013.01); *B60Q 1/40* (2013.01); *B60Q 9/00* (2013.01); *B60W 30/12* (2013.01); *B60W 30/18163* (2013.01); *G08G 1/167* (2013.01); *B60W 2710/20* (2013.01)

(58) Field of Classification Search
CPC ............ B60Q 1/346; B60Q 1/40; B60Q 9/00; B60W 30/12; B60W 30/18163
See application file for complete search history.

(56) References Cited

U.S. PATENT DOCUMENTS

| | | | |
|---|---|---|---|
| 2005/0256630 A1* | 11/2005 | Nishira | B60K 31/0008 701/96 |
| 2005/0270145 A1 | 12/2005 | Kataoka et al. | |
| 2006/0025918 A1 | 2/2006 | Saeki | |
| 2010/0219051 A1 | 9/2010 | Shimizu et al. | |

(Continued)

FOREIGN PATENT DOCUMENTS

| | | |
|---|---|---|
| JP | 2005-138647 A | 6/2005 |
| JP | 2006-315491 A | 11/2006 |
| JP | 2008094111 A | 4/2008 |

(Continued)

*Primary Examiner* — Michael D Lang
(74) *Attorney, Agent, or Firm* — Sughrue Mion, PLLC

(57) ABSTRACT

A driving support ECU detects a shallow pressing operation monitoring signal of the turn signal lever is turned off (S14: Yes). When a timer value Tx representing an ON duration time period in which the shallow pressing operation monitoring signal is continued to be turned on reaches an assist request confirmation time period Tref (S19: Yes) and an LCA start condition is established (S20: Yes) after the detection of the shallow pressing operation monitoring signal, the driving support ECU starts LCA. The driving support ECU does not determines, until the LCA is completed, whether or not the shallow pressing operation monitoring signal is turned off. The driving support ECU restarts processes from S11 after the LCA is completed. Therefore, even if the shallow pressing operation is continued to be performed, the LCA is not executed further.

4 Claims, 10 Drawing Sheets

(56) References Cited

U.S. PATENT DOCUMENTS

2016/0311464 A1    10/2016  Yamaoka

FOREIGN PATENT DOCUMENTS

| JP | 2008-195402 A | 8/2008 |
| JP | 4172434 B2 | 10/2008 |
| JP | 2009-190464 A | 8/2009 |
| JP | 4349210 B2 | 10/2009 |
| JP | 2009-274594 A | 11/2009 |
| JP | 2010-6279 A | 1/2010 |
| JP | 2010201982 A | 9/2010 |
| JP | 4929777 B2 | 5/2012 |
| JP | 2014-148293 A | 8/2014 |
| JP | 2016207060 A | 12/2016 |

\* cited by examiner

LANE CHANGE ASSIST DEVICE FOR A VEHICLE

BACKGROUND OF THE INVENTION

1. Field of the Invention

The present invention relates to a lane change assist device configured to execute lane change assist control, which is control of assisting a steering operation for changing lanes.

2. Description of the Related Art

Hitherto, as proposed in Japanese Patent Application Laid-open No. 2009-274594, there has been known a lane change assist device configured to execute lane change assist control, which is control of assisting a steering operation (steering wheel operation) for changing lanes. The lane change assist device uses, for example, an electric power steering system to provide/generate a steering torque to a steering mechanism, to thereby change the lanes in which an own vehicle travels without the driver's steering operation.

The lane change assist device proposed in Japanese Patent Application Laid-open No. 2009-274594, detects an operation performed by the driver on a turn signal lever, and starts the lane change assist control in response to the operation performed on the turn signal lever.

The lane change assist control is started when it is determined that the own vehicle can safely change lanes based on a monitoring result by surrounding censors which monitor a surrounding of the own vehicle. The driver has possibilities of overestimating (or putting too much trust in) the lane change assist device, and/or failing to monitor the surrounding of the own vehicle by himself/herself, so that the driver may wholly leave a determination of a start of the lane change assist control to the lane change assist device. For example, when the driver continues performing a lane change assist request operation to request the lane change assist, the lane change assist control is started at a timing in which the lane change assist control device determines that the own vehicle can safely change lanes. The driver may continue performing the lane change assist request operation as if the driver reserves the lane change assist. However, when the lane change assist request operation is continued for a long time, a case may arise where driver's unintended lane change (for example, continuous/excess lane change) may be executed. That is, the lane change assist control toward a driver's unintended adjacent lane may be newly started after the own vehicle has changed lanes once.

SUMMARY OF THE INVENTION

The present invention has been made in order to solve the above-mentioned problem, and has an object to provide a lane change assist device that can prevent the driver's unintended lane change assist control from being started.

In order to achieve the above-mentioned object, according to one embodiment of the present invention, there is provided a lane change assist device for a vehicle, including:

lane change assist request detection means (10, 40, S16-S19) for detecting a lane change assist request from a driver in response to an operation performed on an operation unit (41) to request a lane change assist;

surrounding monitor (10, 11) means for monitoring a surrounding of an own vehicle;

lane change assist control means (10, 20, S21) for, when the surrounding monitor means determines that the own vehicle can safely change lanes in which the own vehicle travels (S20: Yes) under a situation in which the lane change assist request detection means has detected the lane change assist request (S19: Yes), accepting the lane change assist request and starting lane change assist control to change lanes; and non-operation detection means (S14: Yes) for detecting a non-operation state in which the operation on the operation unit to request the lane change assist is not performed;

wherein the lane change assist control means is configured to:

accept the lane change assist request when a requisite condition is established (S14 Yes, S16: Yes), the requisite condition being a condition which is set to be established when the lane change assist request detection means detects the operation performed on the operation unit to request the lane change assist under a situation in which the non-operation detection means has detected the non-operation state; and execute, when the lane change assist control means accepts the lane change assist request, the lane change assist control to have the own vehicle change lanes from a current lane in which the own vehicle is currently travelling to a lane immediately adjacent to the current lane (S21, S22).

In this case, it is desirable that the lane change assist request detection means be configured to detect the lane change assist request when the operation performed on the operation unit to request the lane change assist continues for an assist request confirmation period set in advance or more (S19: Yes).

In the lane change assist device according to the embodiment of the present invention, the lane change assist request detection means detects the lane change assist request from the driver in response to the operation performed on the operation unit to request the lane change assist. For example, the lane change assist request detection means detects the lane change assist request when the operation performed on the operation unit to request the lane change assist continues for the assist request confirmation period set in advance or more. Thus, the driver's intention to receive/obtain the lane change assist can be properly detected.

The surrounding monitor means monitors the surrounding of the own vehicle. For example, the surrounding monitor means acquires relative information (a distance, a relative speed, and a relative position) between a three-dimensional object (e.g., another vehicle) which is present in the surround of the own vehicle and the own vehicle. The lane change assist control means accepts the lane change assist request when the surrounding monitor means determines that the own vehicle can safely change lanes (for example, when an inter-vehicle distance between the own vehicle and the another vehicle is appropriately ensured, in consideration of the relative speed therebetween) under a situation in which the lane change assist request detection means has detected the lane change assist request. Then the lane change assist control means starts the lane change assist control to change the lanes in which the own vehicle travels. For example, the lane change assist control means provides/generates a steering torque to a steering mechanism to steer a steering wheel, to thereby control a travel direction of the own vehicle. Accordingly, the driver performs the operation on the operation unit to request the lane change assist so as to have the own vehicle safely change lanes by receiving the lane change assist.

When the driver overestimates (or puts too much trust in) the lane change assist device and continues performing the operation to request the lane change assist (referred to as "lane change assist request operation") as if the driver reserves the lane change assist, a situation in which the lane change assist request is detected continues. In this case, the case may arise where the driver's unintended lane change is executed (for example, the successive and excess lane change is executed). In view of this, the lane change assist device according to the embodiment of the present invention comprises the non-operation detection means.

The non-operation detection means detects the non-operation state in which the operation on the operation unit to request the lane change assist is not performed. The lane change assist control means accepts the lane change assist request when a requisite condition is established, the requisite condition being a condition which is set to be established when the lane change assist request detection means detects the operation performed on the operation unit to request the lane change assist under a situation in which the non-operation detection means has detected the non-operation state, and executes, when the lane change assist control means accepts the lane change assist request, the lane change assist control (corresponding to one lane) to have the own vehicle change lanes from a current lane in which the own vehicle is currently travelling to a lane immediately adjacent to the current lane.

According to the one embodiment of the present invention, even if the driver continues performing the operation on the operation unit to request the lane change assist, the lane change is not further executed, because the lane change assist control is completed/ended when the own vehicle change the lanes from the current lane to the lane immediately adjacent to the current lane. As a result, the one embodiment of the present invention can prevent the driver's unintended lane change assist control from being started.

A feature of one embodiment of the present invention resides in that the lane change assist control means is configured not to accept the lane change assist request, even when the lane change assist request detection means detects the operation performed on the operation unit to request the lane change assist during a period from the start of the lane change assist control to a completion of the lane change assist control (S20: Yes, S21, S22: No).

According to the one embodiment of the present invention, when the driver performs the operation on the operation unit to request the lane change assist during the execution of the lane change assist control, the lane change assist request in response to that operation is not accepted. Accordingly, even if the driver fails to monitor the surrounding of the own vehicle and continues performing the operation on the operation unit as if the driver reserves the further/excess/ extra lane change during the execution of the lane change assist control, the lane change assist control toward a next adjacent lane is not started. Therefore, the one embodiment of the present invention can prevent the driver from performing such operation with overestimating (or putting too much trust in) the lane change assist device.

A feature of one embodiment of the present invention resides in that the lane change assist device for a vehicle further includes turn signal control means (10, 30, S51-S54) for controlling an actuation of a turn signal to start to intermittently flash the turn signal when the lane change assist control is started and to turn-off the turn signal when a turn signal turning-off condition which is set to be established before a completion of the lane change assist control is established, wherein the lane change assist control means is configured not to accept the lane change assist request, even when the lane change assist request detection means detects the operation performed on the operation unit to request the lane change assist during a period from the start of the lane change assist control to the establishment of the turn signal turning-off condition (S21, S31: No, S22: No).

According to the one embodiment of the present invention, the turn signal control means controls the actuation of the turn signal (referred to as a "turn lump" or "turn signal lump",) to start to intermittently flash the turn signal when the lane change assist control is started and to turns-off the turn signal when the turn signal turning-off condition which is set to be established before the completion of the lane change assist control is established. For example, it is desirable that the turn signal turning-off condition be set to be established when the own vehicle reaches a position that is a predetermined length short in a width direction of the own vehicle from a target position to complete the lane change assist control.

The driver usually recognizes that the lane change assist control is completed when the turn signal is turned-off. Thus, the lane change assist request in response to the operation on the operation unit after the turn signal is turned-off represents the driver's intention to obtain a new lane change assist. On the other hand, the operation that has been performed before the turn signal is turned-off may be an operation that the driver have performed while the driver reserves the further lane change assist due to putting too much trust in the lane change assist device.

In view of this, the lane change assist control means does not accept the lane change assist request in response to the operation which is performed on the operation unit to request the lane change assist during the period from the start of the lane change assist control to the establishment of the turn signal turning-off condition. Therefore, the one embodiment of the present invention can prevent the driver from performing the operation while putting too much trust in the lane change assist device.

Furthermore, it is difficult for the driver to definitely recognize a timing of completing the lane change assist control, but it is possible for the driver to definitely recognize a timing of turning-off of the turn signal. Therefore, according to the one embodiment of the present invention, the driver can appropriately recognize a timing from which the driver can request a next lane change assist control.

In the above description, in order to facilitate understanding of the invention, reference symbols used in embodiments of the present invention are enclosed in parentheses and are assigned to each of the constituent features of the invention corresponding to the embodiments. However, each of the constituent features of the invention is not limited to the embodiments defined by the reference symbols.

DESCRIPTION OF THE EMBODIMENTS

Referring to the accompanying drawings, a lane change assist device for a vehicle according to an embodiment of the present invention is described below.

Figure 1:
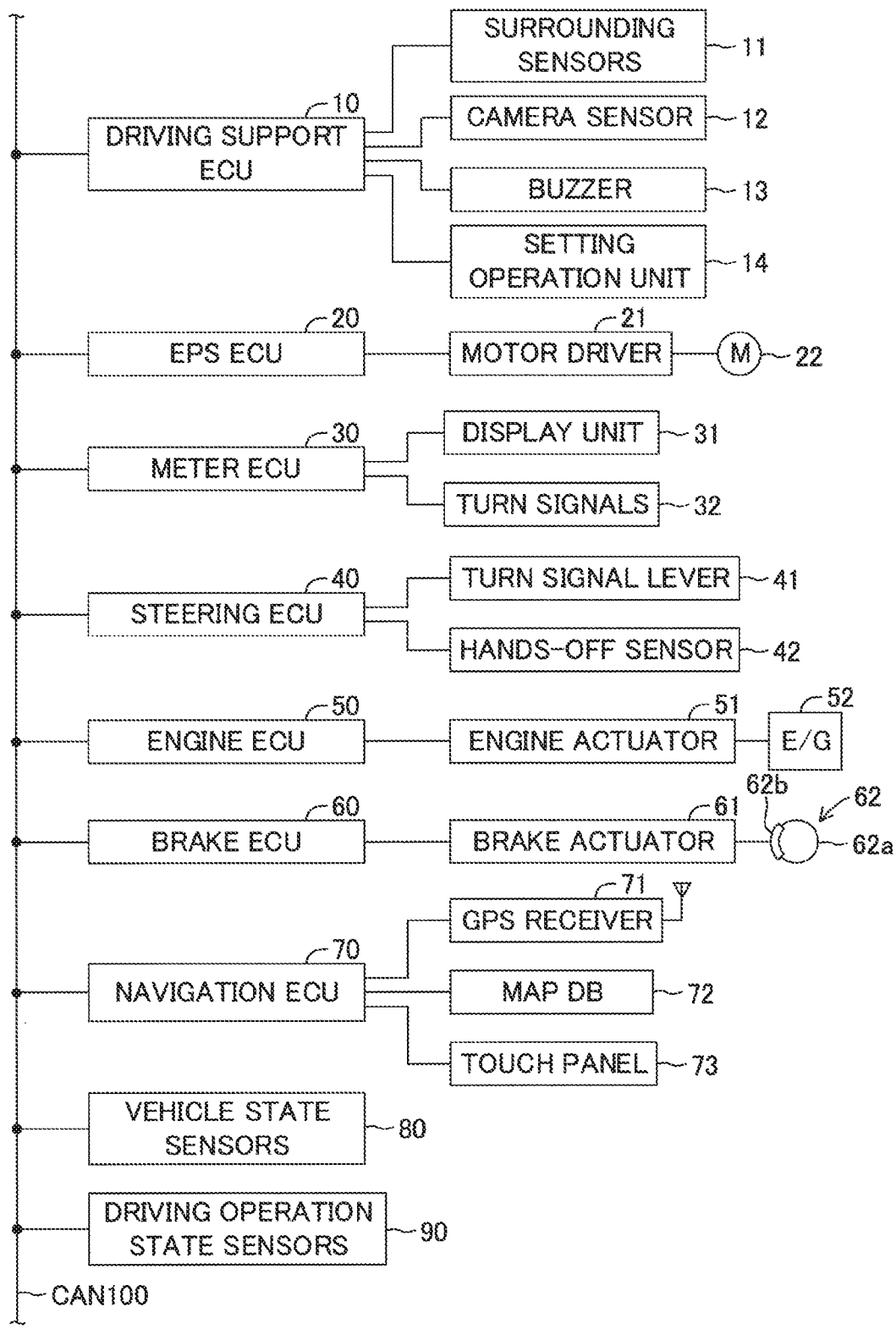
FIG. 1 is a schematic configuration diagram for illustrating a lane change assist device for a vehicle according to an embodiment of the present invention.

The lane change assist device according to the embodiment of the present invention is applied to a vehicle (hereinafter also referred to as "own vehicle" in order to distinguish from other vehicles), and as illustrated in FIG. 1, includes a driving support ECU 10, an electric power steering ECU 20, a meter ECU 30, a steering ECU 40, an engine ECU 50, a brake ECU 60, and a navigation ECU 70.

Those ECUs are electric control units each including a microcomputer as a main part, and are connected to one another so as to be able to mutually transmit and receive information via a controller area network (CAN) 100. The microcomputer herein includes a CPU, a ROM, a RAM, a nonvolatile memory, an interface I/F, and the like. The CPU executes instructions (programs and routines) stored in the ROM to realize various functions. Some or all of those ECUs may be integrated into one ECU.

Further, a plurality of types of vehicle state sensors 80 configured to detect a vehicle state and a plurality of types of driving operation state sensors 90 configured to detect a driving operation state are connected to the CAN 100. Examples of the vehicle state sensors 80 include a vehicle speed sensor configured to detect a travel speed of the vehicle, a front-rear G sensor configured to detect an acceleration in a front-rear direction of the vehicle, a lateral G sensor configured to detect an acceleration in a lateral direction of the vehicle, and a yaw rate sensor configured to detect a yaw rate of the vehicle.

Examples of the driving operation state sensors 90 include an accelerator operation amount sensor configured to detect an operation amount of an accelerator pedal, a brake operation amount sensor configured to detect an operation amount of a brake pedal, a brake switch configured to detect presence or absence of the operation on the brake pedal, a steering angle sensor configured to detect a steering angle, a steering torque sensor configured to detect a steering torque, and a shift position sensor configured to detect a shift position of a transmission.

Information (hereinafter referred to as "sensor information") detected by the vehicle state sensors 80 and the driving operation state sensors 90 is transmitted to the CAN 100. In each ECU, the sensor information transmitted to the CAN 100 can be used as appropriate. The sensor information is information of a sensor connected to a specific ECU, and may be transmitted from the specific ECU to the CAN 100. For example, the accelerator operation amount sensor may be connected to the engine ECU 50. In this case, the sensor information representing the accelerator operation amount is transmitted from the engine ECU 50 to the CAN 100. For example, the steering angle sensor may be connected to the steering ECU 40. In this case, the sensor information representing the steering angle is transmitted from the steering ECU 40 to the CAN 100. The same applies to the other sensors. Further, there may be employed a configuration in which, without interpolation of the CAN 100, the sensor information is transmitted and received through direct communication between specific ECUs.

Figure 2:
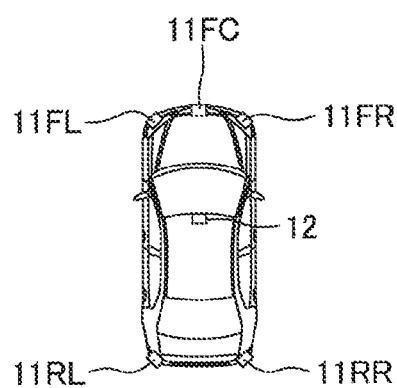
FIG. 2 is a plan view for illustrating disposing positions of surrounding sensors and a camera sensor.

The driving support ECU 10 is a control device serving as a central device for performing driving support for a driver, and executes lane change assist control, lane trace assist control, and adaptive cruise control. As illustrated in FIG. 2, a front-center surrounding sensor 11FC, a front-right surrounding sensor 11FR, a front-left surrounding sensor 11FL, a rear-right surrounding sensor 11RR, and a rear-left surrounding sensor 11RL are connected to the driving support ECU 10. The surrounding sensors 11FC, 11FR, 11FL, 11RR, and 11RL are radar sensors, and basically have the same configuration as each other except that the sensors have different detection regions. In the following, the surrounding sensors 11FC, 11FR, 11FL, 11RR, and 11RL are referred to as "surrounding sensors 11" when the sensors are not required to be individually distinguished from one another.

Each of the surrounding sensors 11 includes a radar transceiver and a signal processor (not shown). The radar transceiver radiates a radio wave in a millimeter waveband (hereinafter referred to as "millimeter wave"), and receives a millimeter wave (that is, reflected wave) reflected by a three-dimensional object (e.g., other vehicles, pedestrian, bicycle, and building) present within a radiation range. The signal processor acquires, every time a predetermined time period elapses, information (hereinafter referred to as "surrounding information") representing, for example, a distance between the own vehicle and the three-dimensional object, a relative speed between the own vehicle and the three-dimensional object, and a relative position (direction) of the three-dimensional object with respect to the own vehicle based on, for example, a phase difference between the transmitted millimeter wave and the received reflected wave, an attenuation level of the reflected wave, and a time period required from transmission of the millimeter wave to reception of the reflected wave. Then, the signal processor transmits the surrounding information to the driving support ECU 10. The surrounding information can be used to detect a front-rear direction component and a lateral direction component in the distance between the own vehicle and the three-dimensional object and a front-rear direction component and a lateral direction component in the relative speed between the own vehicle and the three-dimensional object.

As illustrated in FIG. 2, the front-center surrounding sensor 11FC is disposed at a front-center portion of a vehicle body, and detects a three-dimensional object present in a front region of the own vehicle. The front-right surrounding sensor 11FR is disposed at a front-right corner portion of the vehicle body, and mainly detects a three-dimensional object present in a front-right region of the own vehicle. The front-left surrounding sensor 11FL is disposed at a front-left corner portion of the vehicle body, and mainly detects a three-dimensional object present in a front-left region of the own vehicle. The rear-right surrounding sensor 11RR is disposed at a rear-right corner portion of the vehicle body, and mainly detects a three-dimensional object present in a rear-right region of the own vehicle. The rear-left surrounding sensor 11RL is disposed at a rear-left corner portion of the vehicle body, and mainly detects a three-dimensional object present in a rear-left region of the own vehicle. In the following, the three-dimensional object detected by the surrounding sensor 11 is sometimes referred to as an "object".

In this embodiment, the surrounding sensors 11 are radar sensors, but other sensors such as clearance sonars can be employed instead.

Further, a camera sensor 12 is connected to the driving support ECU 10. The camera sensor 12 includes a camera unit and a lane recognition unit configured to analyze image data obtained based on an image taken by the camera unit to recognize a white line(s) of a road. The camera sensor 12 (camera unit) photographs a landscape in front (ahead) of the own vehicle. The camera sensor 12 (lane recognition unit) supplies information relating to the recognized white line(s) to the driving support ECU 10.

Figure 3:
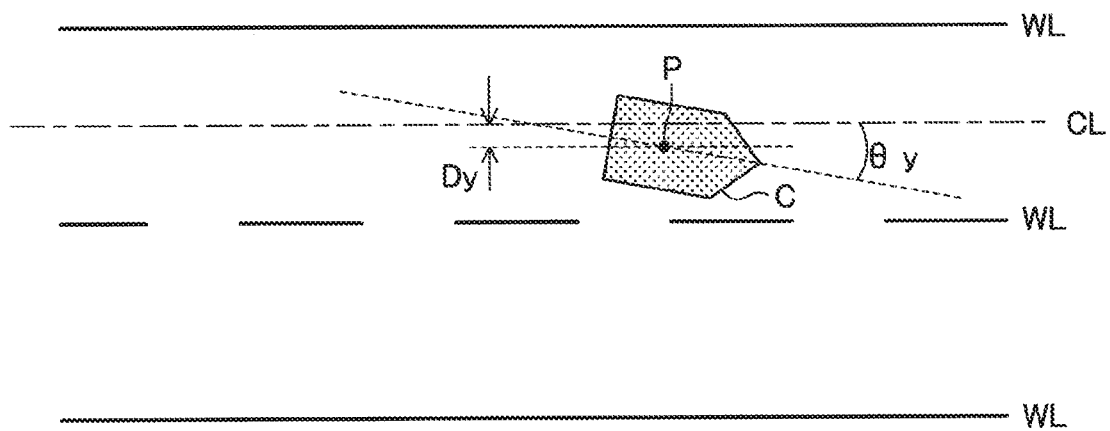
FIG. 3 is a diagram for illustrating lane-related vehicle information.

As illustrated in FIG. 3, the driving support ECU 10 sets/determines a lane center line CL corresponding to a center position in a width direction of right and left white lines WL in a lane in which the own vehicle is traveling based on the information supplied from the camera sensor 12. The lane center line CL is used as a target travel line in the lane trace assist control to be described later. Further, the driving support ECU 10 calculates a curvature Cu of a curve of the lane center line CL.

Further, the driving support ECU 10 calculates the position and the direction of the own vehicle in the lane sectioned by the right and left white lines WL. For example, as illustrated in FIG. 3, the driving support ECU 10 calculates a distance Dy in a road width direction between a reference point P (e.g., position of center of gravity) of an own vehicle C and the lane center line CL, that is, the distance Dy by which the own vehicle C is shifted (deviates) from the lane center line CL in the road width direction. This distance Dy is referred to as "lateral difference Dy". Further, the driving support ECU 10 calculates an angle formed between the direction of the lane center line CL and the direction in which the own vehicle C faces, that is, an angle θy by which the direction in which the own vehicle C faces is shifted (deviates) in a horizontal plane direction from the direction of the lane center line CL. This angle θy is referred to as a "yaw angle θy". In the following, information (Cu, Dy, and θy) representing the curvature Cu, the lateral difference Dy, and the yaw angle θy is referred to as "lane-related vehicle information".

Further, the camera sensor 12 also supplies, to the driving support ECU 10, information relating to the white line(s), for example, the type of the detected white line (solid line or broken line), a distance (lane width) between the right and left adjacent white lines, and the shape of the white line, on not only the lane of the own vehicle but also on adjacent lanes. When the white line is a solid line, the vehicle is inhibited from crossing the white line to change lanes. Otherwise, e.g., when the white line is a broken line (white line intermittently formed at certain intervals), the vehicle is allowed to cross the white line to change lanes. The lane-related vehicle information (Cu, Dy, and θy) and the information relating to the white line(s) are collectively referred to as "lane information".

In this embodiment, the driving support ECU 10 calculates the lane-related vehicle information (Cu, Dy, and θy). Alternatively, the camera sensor 12 may be configured to calculate the lane-related vehicle information (Cu, Dy, and θy) to supply the calculation result to the driving support ECU 10.

Further, the camera sensor 12 can also detect a three-dimensional object present in front (ahead) of the own vehicle based on the image data. Therefore, not only the lane information but also front surrounding information may be acquired through calculation. In this case, for example, there may be provided a synthesis processor (not shown) configured to synthesize the surrounding information acquired by the front-center surrounding sensor 11FC, the front-right surrounding sensor 11FR, and the front-left surrounding sensor 11FL and the surrounding information acquired by the camera sensor 12 to generate front surrounding information having a high detection accuracy. The surrounding information generated by the synthesis processor may be supplied to the driving support ECU 10 as the front surrounding information on the own vehicle.

A buzzer 13 is connected to the driving support ECU 10. The buzzer 13 receives a buzzer sounding signal as input from the driving support ECU 10 and produces a sound. The driving support ECU 10 sounds the buzzer 13 when, for example, the driving support ECU 10 notifies the driver of a driving support situation, or when the driving support ECU 10 alerts the driver.

In this embodiment, the buzzer 13 is connected to the driving support ECU 10, but the buzzer 13 may be connected to other ECUs, for example, a notification ECU (not shown) dedicated for notification, and the buzzer 13 may be sounded by the notification ECU. In this case, the driving support ECU 10 transmits a buzzer sounding command to the notification ECU.

Further, instead of or in addition to the buzzer 13, a vibrator for transmitting vibration for notification to the driver may be provided. For example, the vibrator is provided to a steering wheel to vibrate the steering wheel, to thereby alert the driver.

The driving support ECU 10 executes the lane change assist control, the lane trace assist control, and the adaptive cruise control based on the surrounding information supplied from the surrounding sensors 11, the lane information obtained based on the white line recognition by the camera sensor 12, the vehicle state detected by the vehicle state sensors 80, the driving operation state detected by the driving operation state sensors 90, and the like.

A setting operation unit 14 to be operated by the driver is connected to the driving support ECU 10. The setting operation unit 14 is an operation unit for performing setting or the like regarding whether or not to execute each of the lane change assist control, the lane trace assist control, and the adaptive cruise control. The driving support ECU 10 receives a setting signal as input from the setting operation unit 14 to determine whether or not to execute each control. In this case, when the execution of the adaptive cruise control is not selected, the lane change assist control and the lane trace assist control are also automatically set to be unexecuted. Further, when the execution of the lane trace assist control is not selected, the lane change assist control is also automatically set to be unexecuted.

Further, the setting operation unit 14 has a function of inputting parameters or the like representing the preference of the driver when the above-mentioned control is executed.

The electric power steering ECU 20 is a control device for an electric power steering device. In the following, the electric power steering ECU 20 is referred to as an "EPS ECU 20". The EPS ECU 20 is connected to a motor driver 21. The motor driver 21 is connected to a steering motor 22. The steering motor 22 is integrated/incorporated into a "steering mechanism including the steering wheel, a steering shaft coupled to the steering wheel, a steering gear mechanism, and the like" (not shown) of the vehicle. The EPS ECU 20 detects the steering torque that is input by the driver to the steering wheel (not shown) with steering torque sensor mounted in the steering shaft, and controls energization to the motor driver 21 based on the steering torque to drive the steering motor 22. The assist motor is driven as described above so that the steering torque is applied to the steering mechanism, and thus the steering operation of the driver is assisted.

Further, when the EPS ECU 20 receives a steering command from the driving support ECU 10 via the CAN 100, the EPS ECU 20 drives the steering motor 22 at a control amount expressed by the steering command to generate a steering torque. This steering torque represents a torque to be applied to the steering mechanism in response to the steering command from the driving support ECU 10, which does not require the driver's steering operation (steering wheel operation) unlike a steering assist torque to be applied for alleviating the driver's steering operation described above.

The meter ECU 30 is connected to a display unit 31 and right and left turn signals 32 (meaning turn signal lamps and sometimes also referred to as "turn lamps"). The display unit 31 is, for example, a multi-information display mounted in front of a driver's seat, and displays various types of information in addition to values measured by meters, for example, a vehicle speed. For example, when the meter ECU 30 receives a display command in accordance with the driving support state from the driving support ECU 10, the meter ECU 30 displays a screen instructed in the display command on the display unit 31. As the display unit 31, instead of or in addition to the multi-information display, a head-up display (not shown) can also be employed. When the head-up display is employed, it is preferred to provide a dedicated ECU for controlling the display on the head-up display.

Further, the meter ECU 30 includes a turn signal drive circuit (not shown). When the meter ECU 30 receives a turn signal flashing command via the CAN 100, the meter ECU 30 intermittently flashes the turn signal 32 arranged in a right or left direction instructed by the turn signal flashing command. Further, while the meter ECU 30 intermittently flashes the turn signal 32, the meter ECU 30 transmits, to the CAN 100, turn signal flashing information representing that the turn signal 32 is in an intermittently flashing state. Therefore, other ECUs can recognize the intermittently flashing state of the turn signal 32.

The steering ECU 40 is connected to a turn signal lever 41 and a hands-off sensor 42. The turn signal lever 41 is an operation unit for working (intermittently flashing) the turn signal 32, and is mounted in a steering column. The turn signal lever 41 is mounted to be swingable at a two-stage operation stroke about a support shaft in each of a clockwise operation direction and a counterclockwise operation direction.

Figure 4:
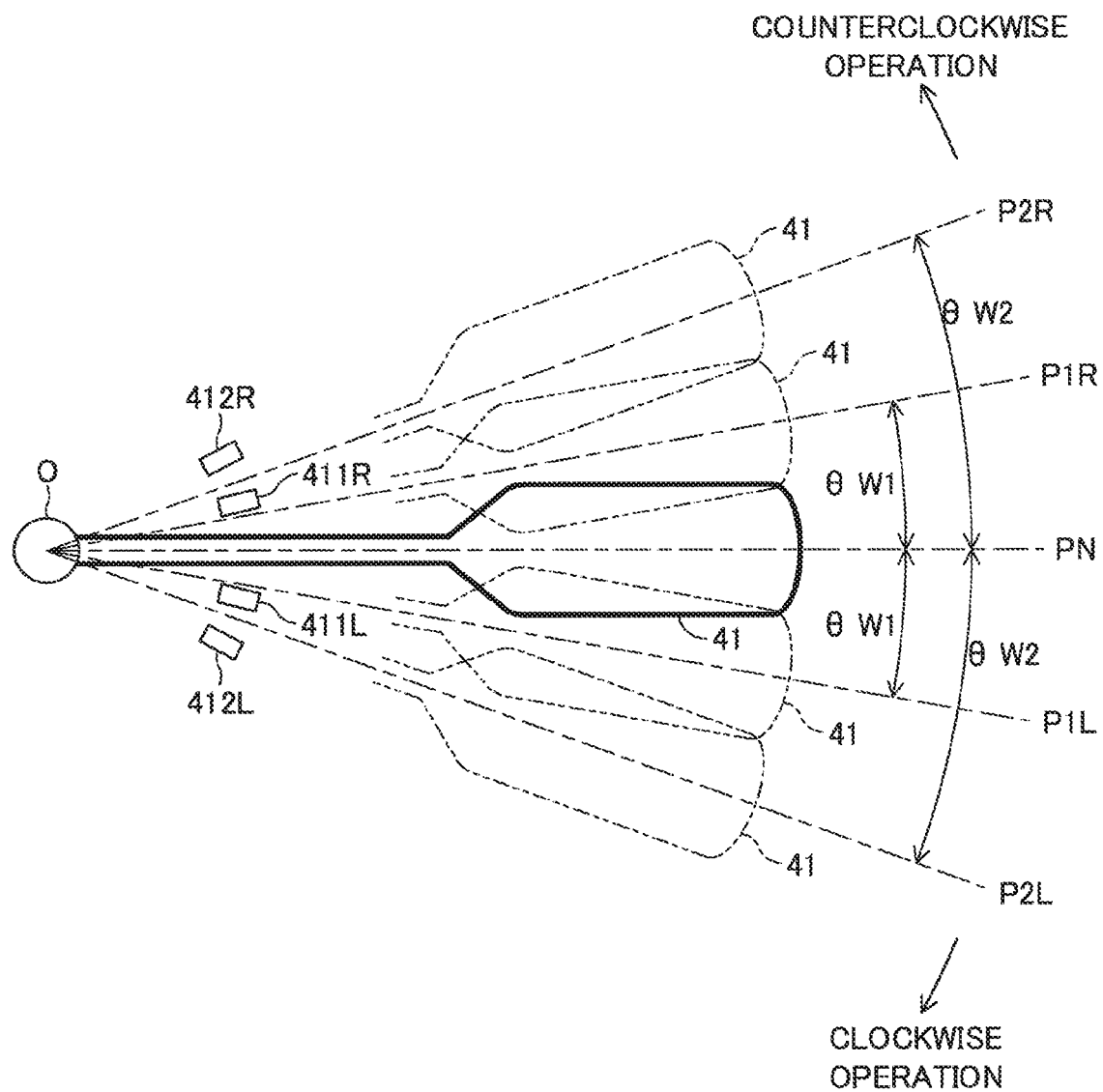
FIG. 4 is a diagram for illustrating actuation of a turn signal lever.

As illustrated in FIG. 4, the turn signal lever 41 is configured to be able to be operated selectively between a first operation position P1L (P1R), which is a position at which the turn signal lever 41 is rotated by a first stroke from a neutral position PN (rotated by a first angle θW1 about a support shaft O), and a second operation position P2L (P2R), which is a position at which the turn signal lever 41 is rotated by a second stroke larger than the first stroke and which is deeper than the first operation position P1L (P1R) from the neutral position PN (rotated by a second angle θW2 (>θW1) about the support shaft O), in each of the clockwise operation direction and the counterclockwise operation direction. The neutral position PN is a position obtained under a state in which the turn signal lever 41 is not operated, that is, a position at which the turn signal 32 is turned off.

When the driver tilts the turn signal lever 41 to the first operation position P1L (P1R), the turn signal lever 41 provides a click feeling to the driver. When the operation force to the turn signal lever 41 is released from this state, the turn signal lever 41 is mechanically returned to the neutral position PN by a returning mechanism (not shown), for example, a spring. Further, when the driver tilts the turn signal lever 41 to the second operation position P2L (P2R), the turn signal lever 41 is held at the second operation position P2L (P2R) by a mechanical lock mechanism (not shown) even when the operation force is released.

The turn signal lever 41 includes a first switch 411L (411R) that is turned on only when the turn signal lever 41 is tilted to the first operation position P1L (P1R), and a second switch 412L (412R) that turns on only when the turn signal lever 41 is tilted to the second operation position P2L (P2R).

The first switch 411L (411R) transmits an ON signal to the steering ECU 40 while the turn signal lever 41 is located at the first operation position P1L (P1R), and the second switch 412L (412R) transmits an ON signal to the steering ECU 40 while the turn signal lever 41 is located at the second operation position P2L (P2R). The operation positions and switches with reference symbols in parenthesis in the description above represent the operation positions and the switches relating to the counterclockwise operation direction.

Under a state in which the turn signal lever 41 is held at the second operation position P2L (P2R), when the steering wheel is reversely rotated to be returned to the neutral position, or when the driver operates the turn signal lever 41 to return the turn signal lever 41 in the neutral position direction, the locking by the lock mechanism is released, and the turn signal lever 41 is returned to the neutral position PN. That is, when the turn signal lever 41 is operated to the second operation position P2L (P2R), the turn signal lever 41 acts in the same manner as a turn signal flashing device which has been hitherto carried out generally. In the following, the operation of tilting the turn signal lever 41 to the first operation position P1L (P1R) is referred to as "shallow pressing operation", and the operation of tilting the turn signal lever 41 to the second operation position P2L (P2R) is referred to as a "deep pressing operation".

Such a turn signal lever configured to switch a switch signal at a two-stage operation stroke is known in, for example, Japanese Patent Application Laid-open No. 2005-138647. This known configuration can be employed also in this embodiment.

The steering ECU 40 transmits, to the driving support ECU 10, a monitoring signal representing presence/absence of the shallow pressing operation on the turn signal lever 41, that is, an on/off state of the first switch 411L (411R), and a monitoring signal representing presence/absence of the deep pressing operation on the turn signal lever 41, that is, an on/off state of the second switch 412L (412R). In the following, the monitoring signal representing the on/off state of the first switch 411L (411R) is referred to as "shallow pressing operation monitoring signal", and the monitoring signal representing the on/off state of the second switch 412L (412R) is referred to as "deep pressing operation monitoring signal". Each of the shallow pressing operation monitoring signal and the deep pressing operation monitoring signal includes a signal for identifying the operation direction (right/left direction) of the turn signal lever 41.

Further, the steering ECU 40 intermittently flashes the turn signal 32 arranged on a side corresponding to the direction in which the turn signal lever 41 is operated while the first switch 411L (411R) is turned on. The steering ECU 40 transmits, to the meter ECU 30, a turn signal flashing command for designating the operation direction (right/left direction) of the turn signal lever 41 so that the turn signal 32 is to be intermittently flashed while the first switch 411L (411R) is turned on. While the meter ECU 30 receives the turn signal flashing command, the meter ECU 30 intermittently flashes the turn signal 32 arranged on the side corresponding to the designated direction. Therefore, the driver can perform the shallow pressing operation on the turn signal lever 41 to intermittently flash the turn signal 32.

When a period in which the first switch 411L (411R) is turned on is shorter than a minimum flashing time period set in advance (that is, the number of times that the turn signal 32 flashes is smaller than the minimum number of times of flashing), the steering ECU 40 may transmit the turn signal flashing command to the meter ECU 30 for the minimum flashing time period so as to ensure the minimum number of times of flashing. In this case, the driver is only required to instantaneously perform the shallow pressing operation on the turn signal lever 41 to intermittently flash the turn signal 32 by a set number of times (minimum number of times of flashing). Further, when the first switch 411L (411R) is turned on, the steering ECU 40 may transmit the turn signal flashing command to the meter ECU 30 for a time period corresponding to a set number of times so that the turn signal 32 intermittently flashes the set number of times regardless of the time period in which the first switch 411L (411R) is turned on.

Further, the steering ECU 40 intermittently flashes the turn signal 32 arranged on a side corresponding to the operation direction while the second switch 412L (412R) is turned on. In this case, while the second switch 412L (412R) is turned on, the steering ECU 40 transmits, to the meter ECU 30, a turn signal flashing command for designating the operation direction (right/left direction). While the meter ECU 30 receives the turn signal flashing command, the meter ECU 30 intermittently flashes the turn signal 32 arranged on the side corresponding to the designated direction. Therefore, when the deep pressing operation is performed on the turn signal lever 41, the intermittently flashing of the turn signal 32 continues from when the deep pressing operation is started to when the returning operation is performed on the turn signal lever 41 or on the steering wheel.

The driving support ECU 10 receives the shallow pressing operation monitoring signal and the deep pressing operation monitoring signal. The driving support ECU 10 measures an ON duration time period of the shallow pressing operation monitoring signal (duration time period during which the first switch 411L (411R) is turned on, that is, duration time period during which the turn signal lever 41 is held at the first operation position P1L (P1R)), and determines whether or not the ON duration time period is equal to or longer than an assist request confirmation time period (e.g., one second) set in advance. When the ON duration time period of the shallow pressing operation monitoring signal is equal to or longer than the assist request confirmation time period, the driving support ECU 10 determines that the driver is making a request for the lane change assist.

Therefore, the shallow pressing operation on the turn signal lever 41 is an operation for requesting the lane change assist request operation for the driver to request the lane change assist. When the shallow pressing operation continues for the assist request confirmation time period or more, the driver's lane change assist request is confirmed. That is, when the shallow pressing operation continues for the assist request confirmation time period or more, the driving support ECU 10 detects the driver's lane change assist request. The lane change assist control to be described later is started based on the detection of the lane change assist request.

Further, when the deep pressing operation monitoring signal is turned on (when the turn signal lever 41 is operated to the second operation position P2L (P2R)), the driving support ECU 10 does not execute the steering assist control (LTA and LCA to be described later). That is, when the deep pressing operation monitoring signal is turned on while the steering assist control is executed, the driving support ECU 10 stops the steering assist control, and does not start the steering assist control under a situation in which the deep pressing operation monitoring signal is turned on.

In this embodiment, when the deep pressing operation is performed on the turn signal lever 41, the turn signal lever 41 is locked at that position even when the driver releases the operation force. Alternatively, even when the deep pressing operation is performed, similarly to the shallow pressing operation, the turn signal lever 41 may be automatically returned to the neutral position by a mechanical returning mechanism (not shown) when the driver releases the operation force. In the case of this configuration, even when the second switch 412L (412R) is switched from the ON state to the OFF state, the steering ECU 40 continues to transmit the turn signal flashing command of the turn signal 32 arranged on the side corresponding to the operation direction until the steering wheel is detected to return to the vicinity of the neutral position based on the steering angle.

The hands-off sensor 42 is a sensor configured to detect that the driver is not holding the steering wheel. The hands-off sensor 42 transmits a hands-off detection signal representing whether or not the driver is holding the steering wheel to the driving support ECU 10 via the CAN 100. While the lane change assist control and the lane trace assist control are executed, when a state in which the driver does not hold the steering wheel continues for a hands-off determination time period set in advance or more, the driving support ECU 10 determines that a "hands-off state" holds true. When the driving support ECU 10 determines that the hands-off state holds true, the driving support ECU 10 sounds the buzzer 13 to alert the driver. This alerting is referred to as "hands-off warning".

The engine ECU 50 is connected to an engine actuator 51. The engine actuator 51 is an actuator for changing an operation state of an internal combustion engine 52. In this embodiment, the internal combustion engine 52 is a gasoline fuel injection, spark ignition, multi-cylinder engine, and includes a throttle valve for adjusting an intake air amount. The engine actuator 51 includes at least a throttle valve actuator for changing an opening degree of the throttle valve. The engine ECU 50 can drive the engine actuator 51, thereby changing a torque generated by the internal combustion engine 52. The torque generated by the internal combustion engine 52 is transmitted to drive wheels (not shown) via a transmission (not shown). Thus, the engine ECU 50 can control the engine actuator 51 to control a driving force of the own vehicle, thereby changing an acceleration state (acceleration).

The brake ECU 60 is connected to a brake actuator 61. The brake actuator 61 is provided in a hydraulic circuit between a "master cylinder (not shown) configured to pressurize a working fluid in response to a stepping force on a brake pedal" and "friction brake mechanisms 62 provided at the front/rear left/right wheels". The friction brake mechanism 62 includes a brake disk 62a fixed to the wheel and a brake caliper 62b fixed to a vehicle body. The brake actuator 61 is configured to adjust a hydraulic pressure supplied to a wheel cylinder included in the brake caliper 62b in accordance with an instruction from the brake ECU 60 to use the hydraulic pressure to operate the wheel cylinder, thereby pressing a brake pad against the brake disk 62a and generating a friction braking force. Thus, the brake ECU 60 can control the brake actuator 61, thereby controlling the braking force of the own vehicle.

The navigation ECU 70 includes a GPS receiver 71 configured to receive a GPS signal for detecting a current position of the own vehicle, a map database 72 having map information and the like stored therein, and a touch panel (touch panel-type display) 73. The navigation ECU 70 identifies the position of the own vehicle at the current time point based on the GPS signal, and performs various types of calculation processing based on the position of the own vehicle and the map information and the like stored in the map database 72, to thereby perform route guidance with use of the touch panel 73.

The map information stored in the map database 72 includes road information. The road information includes parameters (e.g., road curvature radius or curvature representing the degree of the curve of the road, and the road lane width) representing the shape of the road for each section of the road. Further, the road information includes road type information for enabling distinction of whether or not the road is a road for exclusive use by automobiles, and information on the number of lanes.

<Control Processing Performed by Driving Support ECU 10>

Next, control processing performed by the driving support ECU 10 is described. Under a situation in which both of the lane trace assist control and the adaptive cruise control are being executed, when the lane change assist request is accepted, the driving support ECU 10 executes the lane change assist control. In view of this, the lane trace assist control and the adaptive cruise control are first described.

<Lane Trace Assist Control (LTA)>

The lane trace assist control provides/generates the steering torque to the steering mechanism so that the position of the own vehicle is maintained in the vicinity of the target travel line inside a "lane in which the own vehicle is traveling", thereby assisting the steering operation of the driver. In this embodiment, the target travel line is the lane center line CL, but a line offset in the road width direction by a predetermined distance from the lane center line CL can also be adopted as the target travel line.

In the following, the lane trace assist control is referred to as an "LTA". The LTA is widely known (e.g., refer to Japanese Patent Application Laid-open No. 2008-195402, Japanese Patent Application Laid-open No. 2009-190464, Japanese Patent Application Laid-open No. 2010-6279, and Japanese Patent No. 4349210) although the LTA itself has various names. Thus, a brief description on the LTA is now given.

The driving support ECU 10 is configured to carry out the LTA when the LTA is requested by the operation on the setting operation unit 14. When the LTA is requested, the driving support ECU 10 calculates a target steering angle θlta* in accordance with Expression (1) based on the above-mentioned lane-related vehicle information (Cu, Dy, and θy) every time a predetermined time (calculation period) elapses.

$$\theta lta^* = Klta1 \cdot Cu + Klta2 \cdot \theta y + Klta3 \cdot Dy + Klta4 \cdot \Sigma Dy \quad (1)$$

In Expression (1), Klta1, Klta2, Klta3, and Klta4 are control gains. The first term on the right-hand side is a steering angle component that is determined in accordance with the curvature Cu of the road and acts in a feed-forward manner. The second term on the right-hand side is a steering angle component that acts in the feed-back manner so that the yaw angle θy is decreased (so that the difference of the direction of the own vehicle with respect to the lane center line CL is decreased). That is, the second term on the right-hand side is a steering angle component calculated by feed-back control with the target value of the yaw angle θy being set to zero. The third term on the right-hand side is a steering angle component that acts in a feed-back manner so that the lateral difference Dy, which is a positional gap (positional difference) between the own vehicle and the lane center line CL in the road width direction, is decreased. That is, the third term on the right-hand side is a steering angle component calculated by feed-back control with the target value of the lateral difference Dy being set to zero. The fourth term on the right-hand side is a steering angle component that acts in a feed-back manner so that an integral value ΣDy of the lateral difference Dy is decreased. That is, the fourth term on the right-hand side is a steering angle component calculated by feed-back control with the target value of the integral value ΣDy being set to zero.

A target steering angle θlta* becomes an angle to have the own vehicle travel toward the left direction, for example, when the lane center line CL curves to the left (direction), when the own vehicle is laterally shifted/deviated in the right direction from the lane center line CL, and when the own vehicle is facing to the right (direction) with respect to the lane center line CL. Further, a target steering angle θlta* becomes an angle to have the own vehicle travel toward the right direction, when the lane center line CL curves to the right (direction), when the own vehicle is laterally shifted/deviated in the left direction from the lane center line CL, and when the own vehicle is facing to the left (direction) with respect to the lane center line CL. Therefore, when Expression (1) is calculated, the calculation is only required to be performed with use of symbols corresponding to the right/left direction.

The driving support ECU 10 outputs/transmits, to the EPS ECU 20, a command signal representing the target steering angle θlta* that is the calculation result. The EPS ECU 20 controls the drive of the steering motor 22 so that the steering angle follows (becomes equal to) the target steering angle θlta*. In this embodiment, the driving support ECU 10 outputs the command signal representing the target steering angle θlta* to the EPS ECU 20, but the driving support ECU 10 may calculate a target torque for obtaining the target steering angle θlta*, and output, to the EPS ECU 20, a command signal representing the target torque that is the calculation result.

The LTA is only used to support the driver's driving operation so that the travel position of the own vehicle follows the lane center line CL. Therefore, even when the LTA is executed, hands-off driving is not allowed, and the driver is required to hold the steering wheel (steering wheel operation is unnecessary).

The above is the outline of the LTA.

<Adaptive Cruise Control (ACC)>

When a preceding vehicle traveling immediately ahead of the own vehicle is present, the adaptive cruise control has the own vehicle follow the preceding vehicle while maintaining an inter-vehicle distance between the preceding vehicle and the own vehicle to a predetermined distance based on the surrounding information. When there is no preceding vehicle, the adaptive cruise control has the own vehicle travel at a constant setting vehicle speed. In the following, the adaptive cruise control is referred to as an "ACC". The ACC itself is widely known (e.g., refer to Japanese Patent Application Laid-open No. 2014-148293, Japanese Patent Application Laid-open No. 2006-315491, Japanese Patent No. 4172434, and Japanese Patent No. 4929777). Thus, a brief description on the ACC is now given.

The driving support ECU 10 is configured to carry out the ACC when the ACC is requested by the operation on the setting operation unit 14. That is, the driving support ECU 10 is configured to select a following-objective-vehicle based on the surrounding information acquired from the surrounding sensors 11 when the ACC is requested. For example, the driving support ECU 10 determines whether or not a relative position of the detected object (n) identified by a lateral distance Daccy(n) and an inter-vehicle distance Daccx(n) of the object (n) is in a following-objective-vehicle area defined in advance. The following-objective-vehicle area is so defined that the lateral distance decreases as the inter-vehicle distance increases. Then, the driving support ECU 10 selects the object (n) as the following-objective-vehicle when the relative position of the object represents the object is in the following-objective-vehicle area for a period equal to or more than a predetermined period.

Further, the driving support ECU 10 calculates a target acceleration Gacc* in accordance with any one of Expression (2) and Expression (3). In Expression (2) and Expression (3), Vaccx(a) is a relative speed of a following-objective-vehicle (a), Kacc1 and Kacc2 are predetermined positive gains (coefficients), and ΔDacc is an inter-vehicle distance difference (=Daccx(a)−Dacc*) acquired by subtracting the "target inter-vehicle distance Dacc* from an inter-vehicle distance Daccx(a) of the following-objective-vehicle (a)". The target inter-vehicle distance Dacc* is calculated by multiplying a target inter-vehicle period Tacc* set by the driver using the setting operation unit 14 by the vehicle speed V of the own vehicle (that is, Dacc=Tacc*·V).

The driving support ECU 10 uses Expression (2) to determine the target acceleration Gacc* when the value (Kacc1·ΔDacc+Kacc2·Vaccx(a)) is positive or "0". Kacca1 is a positive gain (coefficient) for acceleration, and is set to a value equal to or less than "1".

The driving support ECU 10 uses Expression (3) to determine the target acceleration Gacc* when the value (Kacc1·ΔDacc+Kacc2·Vaccx(a)) is negative. Kaccd1 is a gain (coefficient) for deceleration, and is set to "1" in this example.

$$Gacc^*(\text{for acceleration}) = Kacca1 \cdot (Kacc1 \cdot \Delta Dacc + Kacc2 \cdot Vaccx(a)) \quad (2)$$

$$Gacc^*(\text{for deceleration}) = Kaccd1 \cdot (Kacc1 \cdot \Delta Dacc + Kacc2 \cdot Vaccx(a)) \quad (3)$$

When no object is present in the following subject vehicle area, the driving support ECU 10 determines the target acceleration Gacc* based on a "target speed set in accordance with the target inter-vehicle distance Tacc*" and the vehicle speed V so that the vehicle speed V matches the set target speed.

The driving support ECU 10 uses the engine ECU 50 to control the engine actuator 51, and, depending on necessity, uses the brake ECU 60 to control the brake actuator 61 so that the acceleration of the own vehicle matches (becomes equal to) the target acceleration Gacc*.

Further, during the ACC, the driving support ECU 10 reads, from the navigation ECU 70, information representing the curvature of the road that is a predetermined distance ahead of the position of the own vehicle (prefetches the road curvature), and sets an upper-limit speed of the own vehicle, which decreases as the curvature increases (as the curve becomes steeper), to thereby limit the vehicle speed so that the vehicle speed of the own vehicle does not exceed the upper-limit speed. In the following, such control is preferred to as "speed management".

The above is the outline of the ACC.

<Lane Change Assist Control (LCA)>

The lane change assist control refers to the following control. After the surrounding of the own vehicle is monitored and it is determined that the own vehicle can safely change lanes, the lane change assist control provides/generates a steering torque to the steering mechanism so that the lane change assist control has the own vehicle move from the lane in which the own vehicle is currently traveling to the adjacent lane while monitoring the surrounding of the own vehicle. Thus, the driver's steering operation (lane change operation) is assisted. Therefore, the lane change assist control can have the own vehicle change lanes in which the own vehicle travels without the driver's steering operation (steering wheel operation). In the following, the lane change assist control is referred to as "LCA".

Similarly to the LTA, the LCA is control of a lateral position with respect to the lane of the own vehicle, and is executed in place of the LTA when the lane change assist request is accepted while the LTA and the ACC are being executed. In the following, the LTA and the LCA are collectively referred to as "steering assist control", and the state of the steering assist control is referred to as "steering assist control state".

<Calculation of Target Trajectory>

Figure 5:
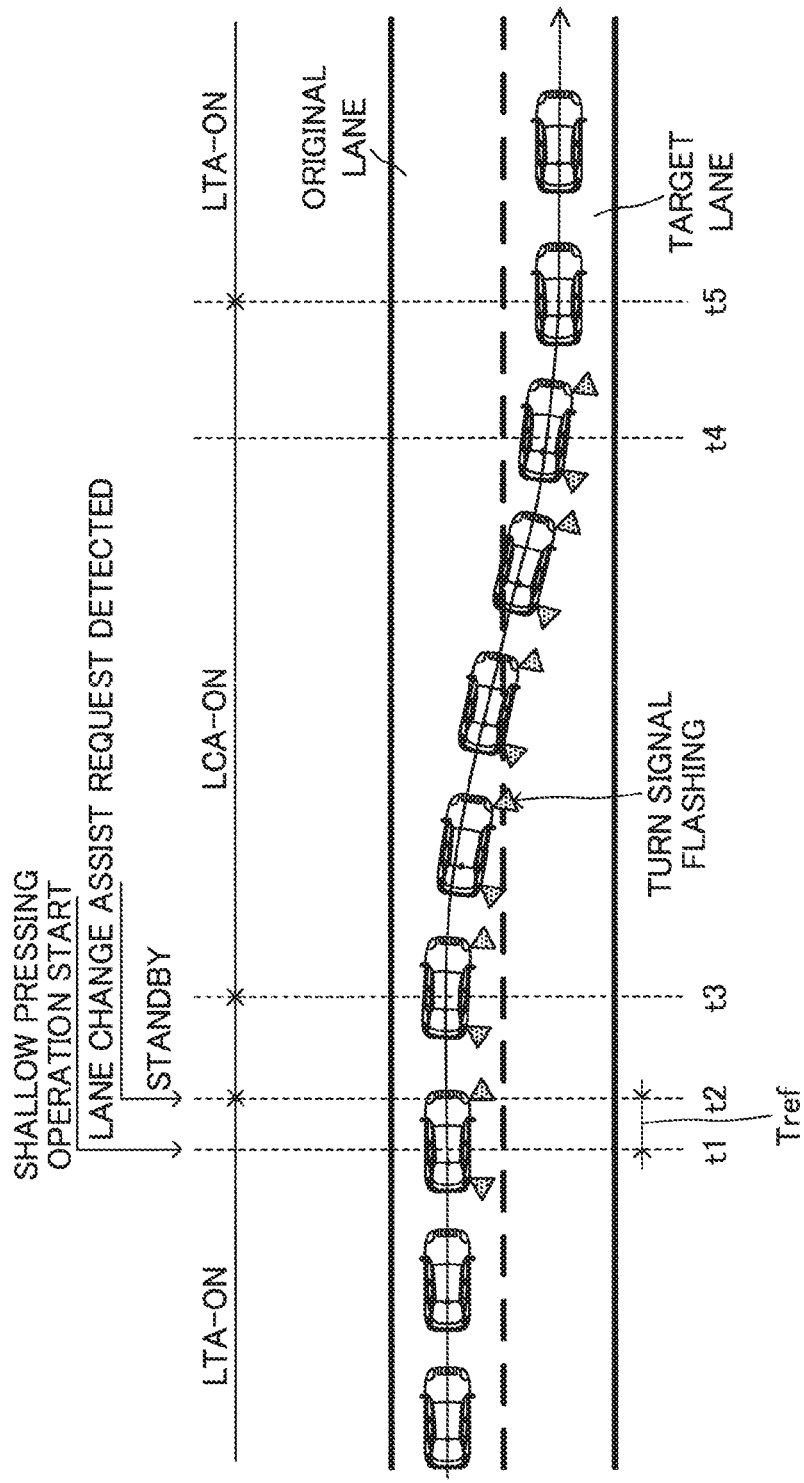
FIG. 5 is a diagram for illustrating a steering assist control state and a trajectory of an own vehicle.

When the driving support ECU 10 executes the LCA, the driving support ECU 10 calculates a target trajectory of the own vehicle based on the lane information at the current time point, which is supplied from the camera sensor 12, and on the vehicle state of the own vehicle. The target trajectory is a trajectory along which the own vehicle is to be moved for the target lane change time period from the lane (referred to as an "original lane") in which the own vehicle is currently traveling to the center position in the width direction (referred to as a "final target lateral position") of the lane (referred to as a "target lane") specified by the lane change assist request direction, which is adjacent to the original lane. The target trajectory has, for example, a shape as illustrated in FIG. 5. The target trajectory is represented with use of a target lateral position y(t) of the own vehicle with respect to the lane center line CL of the original lane (see FIG. 3), wherein "t" is an elapsed time (period) from the (actuation) start time point of the LCA.

In this embodiment, the target lane change time period is set to be variable in proportion to the distance of moving the own vehicle in the lateral direction to the final target lateral position (hereinafter referred to as "necessary lateral distance"). When the lane width is 3.5 m as in the case of general roads, the target lane change time period is set to, for example, 8.0 seconds. This example corresponds to a case in which the own vehicle is positioned on the lane center line CL of the original lane at the start of the LCA. When the lane width is, for example, 4.0 m, the target lane change time period is set to a value corresponding to the lane width, in this example, to 9.1 seconds (=8.0×4.0/3.5).

Further, when the lateral-direction position of the own vehicle at the start of the LCA is shifted to the lane change side with respect to the lane center line CL of the original lane, the target lane change time period is set to be decreased as the shift amount (lateral difference Dy) is increased. On the other hand, when the lateral-direction position of the own vehicle at the start of the LCA is shifted to the opposite side of the lane change side with respect to the lane center line CL of the original lane, the target lane change time period is set to be increased as the shift amount (lateral difference Dy) is increased. For example, when the shift amount is 0.5 m, the increase/decrease adjustment amount of the target lane change time period may be 1.14 seconds (=8.0×0.5/3.5).

In this embodiment, a target lateral position y is calculated in accordance with a target lateral position function y(t) expressed by Expression (4). The lateral position function y(t) is a fifth-order function using the elapsed time period t.

$$y(t)=a \cdot t^5+b \cdot t^4+c \cdot t^3+d \cdot t^2+e \cdot t+f \qquad (4)$$

In Expression (4), the constants a, b, c, d, e, and f are determined based on the travel state of the own vehicle, the lane information, the target lane change time period, and the like at the time of the calculation. In this embodiment, a vehicle model stored in advance is used, and the travel state of the own vehicle, the lane information, and the target lane change time period are input to the vehicle model. Thus, the above-mentioned constants a, b, c, d, e, and f are calculated so that a smooth target trajectory can be obtained. The calculated constants a, b, c, d, e, and f are substituted into Expression (4) to obtain the target lateral position function y(t). The elapsed time period t from the LCA start time is substituted into the target lateral position function y(t), and thus the target lateral position at that time point can be obtained. In this case, f represents an initial lateral position of the own vehicle when t=0 is established, that is, when the LCA is started, and hence f is set to a value equal to the lateral difference Dy.

The target lateral position y can be set by any method. For example, other than the above-mentioned calculation method, the driving support ECU 10 may store in advance a plurality of lateral position functions y(t), each having the constants a to f set for every necessary lateral distance required for laterally moving the own vehicle to the final target lateral position, and the driving support ECU 10 may select, from the plurality of lateral position functions y(t), a lateral position function y(t) corresponding to the necessary lateral distance and the target lane change time period used when the LCA is started.

Further, the target lateral position y is not required to be calculated with use of the fifth-order function, and may be obtained with use of a function set as appropriate.

<Calculation of Target Steering Angle>

The driving support ECU 10 is executing the LTA before the LCA is started. In the LTA, the target steering angle is calculated as described above, and the steering torque is generated so that the actual steering angle coincides with (matches) the target steering angle. Also in the LCA, similarly to the LTA, the driving support ECU 10 calculates the target steering angle, and the steering torque is generated so that the actual steering angle coincides with (matches) the target steering angle.

When the target steering angle is calculated for the LCA, it is only required to change the target values of the curvature, the yaw angle, and the lateral difference of the calculation expression for the target steering angle in the LTA. That is, in the LTA, the target value of the curvature is set to the curvature of the lane in which the own vehicle travels, and the target values of the yaw angle and the lateral difference are set to zero. In contrast, in the LCA, a target curvature Cu*, a target yaw angle θy*, and a target lateral difference Dy* are determined based on the shape of the target trajectory represented by Expression (4).

The driving support ECU 10 calculates a target steering angle θlca* as a control amount of the LCA based on Expression (5) every time a predetermined time (calculation period) elapses.

$$\theta lca^*=Klca1 \cdot Cu^*+Klca2 \cdot (\theta y^*-\theta y)+Klca3 \cdot (Dy^*-Dy)+ Klca4 \cdot \sigma(Dy^*-Dy) \qquad (5)$$

In Expression (5), values in the lane-related vehicle information (Cu, Dy, and θy) at the current time point (at the time of calculation) are used for θy and Dy. Klca1, Klca2, Klca3, and Klca4 are control gains.

The first term on the right-hand side is a steering angle component that acts in a feed-forward manner and is determined in accordance with the target curvature Cu* determined based on the shape of the target trajectory. The second term on the right-hand side is a steering angle component that acts in the feed-back manner so that the difference between the target yaw angle θy* determined based on the shape of the target trajectory and the actual yaw angle θy is decreased. The third term on the right-hand side is a steering angle component that acts in a feed-back manner so that the difference between the target lateral difference Dy* determined based on the shape of the target trajectory and the actual lateral difference Dy is decreased. The fourth term on the right-hand side is a steering angle component that acts in a feed-back manner so that an integral value Σ(Dy*−Dy) of the difference between the target lateral difference Dy* and the actual lateral difference Dy is decreased. In this manner, the target steering angle θlca* is calculated as the control amount of the LCA, and thus smooth transition from the LTA to the LCA can be achieved.

The driving support ECU 10 transmits a steering command representing the target steering angle θlca* to the EPS ECU 20 every time the driving support ECU 10 calculates the target steering angle θlca*. In this manner, the own vehicle travels along the target trajectory to change lanes.

<Steering Assist Control Routine>

Figure 6:
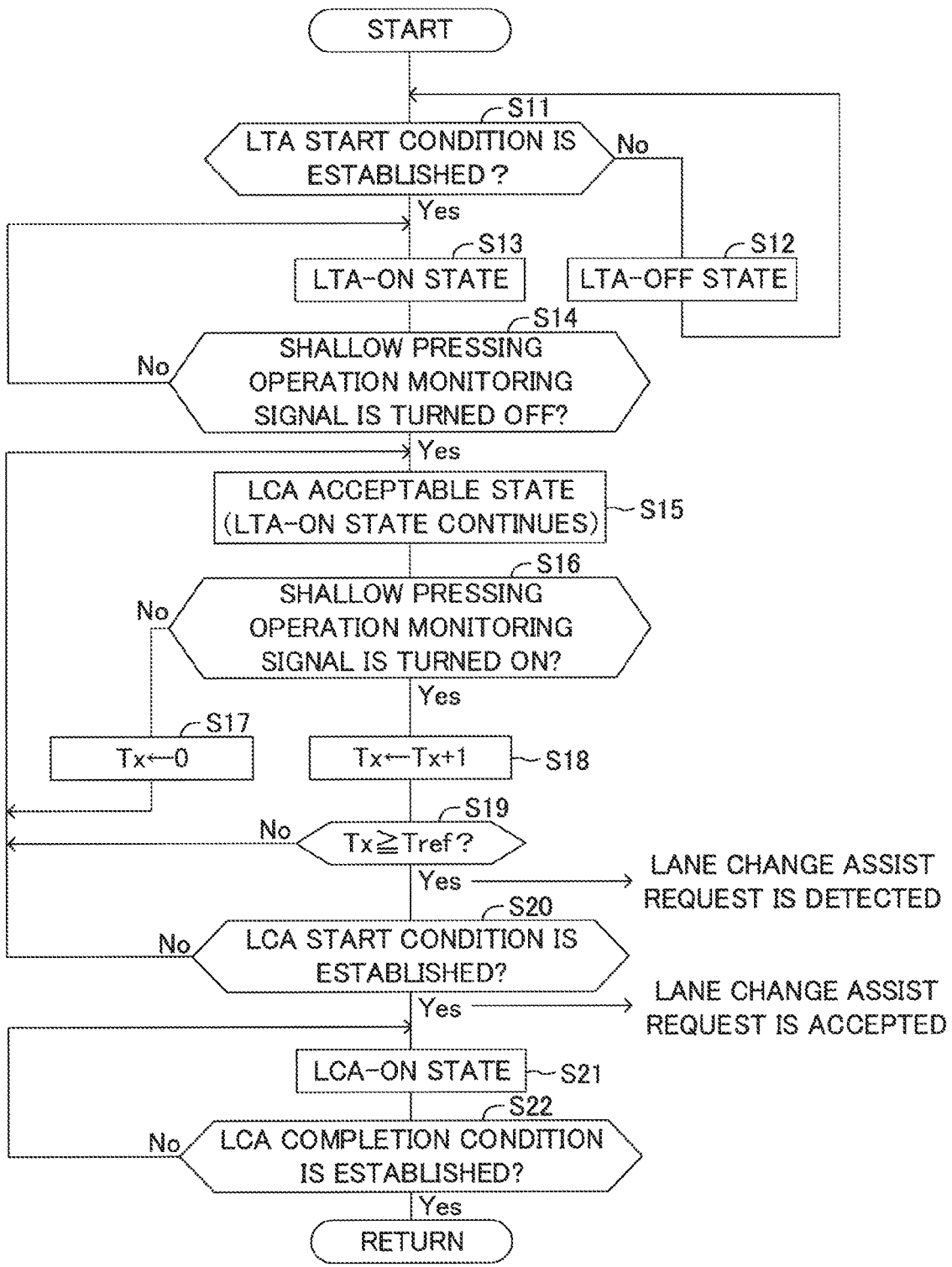
FIG. 6 is a flowchart for illustrating a steering assist control routine of the embodiment.

Next, the steering assist control to change control states between the LTA and the LCA is described. FIG. 6 is an illustration of a steering assist control routine to be executed by the driving support ECU 10. While an ignition switch is turned on, the driving support ECU 10 executes repeatedly the steering assist control routine.

When the steering assist control routine is activated, in Step S11, the driving support ECU 10 determines whether or not LTA start condition set in advance is established.

For example, the LTA start condition is established when all of the following conditions are established.

1-1. Execution of the LTA has been selected by the setting operation unit 14.

1-2. The ACC is being executed.

1-3. The vehicle speed is within a predetermined vehicle speed range.

1-4. The white lines have been recognized.

1-5. The deep pressing operation on the turn signal lever 41 has not been detected.

The LTA start condition is not limited to the above-mentioned condition, and can be set as appropriate.

When the LTA start condition is not established (S11: No), the driving support ECU 10 proceeds the process to Step S12 and sets the steering assist control state to an LTA-OFF state. The LTA-OFF state represents a control state in which the LTA is not executed. Therefore, in the LTA-OFF state, the driver has to perform a steering operation (steering wheel operation) manually.

When the driving support ECU 10 sets the steering assist control state to the LTA-OFF state, the driving support ECU 10 returns the process to the Step S11. The driving support ECU 10 repeats these processes (S11-S12) until the LTA start condition is established.

When the LTA start condition is established (S11: Yes), in Step S 13, the driving support ECU 10 sets the steering assist control state to a LTA-ON state. The LTA-ON state represents a control state in which the LTA is executed. Thus, the driving support ECU 10 starts the LTA.

Subsequently, the driving support ECU 10 determines whether or not the shallow pressing operation monitoring signal transmitted by the steering ECU 40 is "off" (both of the first switches 411L and 411R are in off states). The state in which the shallow pressing operation monitoring signal is "off" represents the state in which the driver does not perform the shallow pressing operation, that is, the state in which the lane change assist request operation is not performed. In other words, such state represents the state in which the non-operation state of one embodiment of the present invention is detected.

When the shallow pressing operation monitoring signal is "off", the driving support ECU 10 proceeds the process to Step S15. On the other hand, when the shallow pressing operation monitoring signal is not "off", the driving support ECU 10 repeats the determination step in Step S14 with executing the LTA. Therefore, the driving support ECU 10 proceeds the process to next Step S15, only when the shallow pressing operation monitoring signal is "off".

When the driving support ECU 10 detects that the shallow pressing operation monitoring signal is "off" (S14: Yes), in Step S15, the driving support ECU 10 sets the steering assist control state to an LCA acceptable state. When the steering assist control state is the LCA acceptable state, the LTA-ON state continues and determination processes (S16-S19) to accept the LCA are repeated.

When the steering assist control state is set to the LCA acceptable state, the driving support ECU 10 determines whether or not the shallow pressing operation monitoring signal is "on" (either of the first switches 411L or 411R is in an on state). The driving support ECU 10 executes these two steps of Step S14 and S16 so that the deriving support ECU 10 can determine whether or not the lane change assist request operation is performed under a situation in which the turn signal lever 41 has been in the non-operation state.

When the shallow pressing operation monitoring signal is not "on" (S16: No), in Step S17, the driving support ECU 10 resets (Tx=0) a value of a timer (referred to as "timer value Tx") for counting an ON duration time period in which the shallow pressing operation monitoring signal is continued to be "on" (an ON duration time period in which the either of the first switches 411L or 411R is continued to be in the on state), and returns the process to Step S15. At a first execution of the determination of Step S16, the determination result of Step S16 is inevitably "No" because it is determined that the shallow pressing operation monitoring signal is "off" in Step S14. Thus, the timer value Tx inevitably is reset.

These processes is repeated, and when the shallow pressing operation monitoring signal is turned on (or "on"), the driving support unit 10, in Step S18, increments the timer value Tx by "1". Subsequently, the driving support ECU 10, in Step S19, determines whether or not the timer value Tx is equal to or larger than an assist request confirmation time period Tref.

The assist request confirmation time period Tref is a time period used to confirm the driver's request for the lane change assist. For example, the assist request confirmation time period Tref is set to about one second.

When the timer value Tx does not reach the assist request confirmation time period Tref (when a duration time period of shallow pressing operation on the turn signal lever 41 by the driver does not reach the assist request confirmation time period Tref), the driving support ECU 10 repeats the process to Step S15. Therefore, the LTA is continued as it is.

While these processes are repeated, and when the shallow pressing operation monitoring signal is turned off (when the driver releases the shallow pressing operation on the turn signal lever 41) before the timer value Tx reaches the assist request confirmation time period Tref, the driving support ECU 10 resets the timer value Tx (S16: No, S17).

On the other hand, when the timer value Tx reaches the assist request confirmation time period Tref (S19: Yes), the driving support ECU 10, in Step S20, determines whether or not an LCA start condition is established. When the timer value Tx reaches the assist request confirmation time period Tref, the driving support ECU 10 determines that the driver has requested the lane change assist. In other words, when the timer value Tx reaches the assist request confirmation time period Tref, the driving support ECU 10 detects the lane change assist request from the driver.

For example, the LCA start condition is established when all of the following conditions are established.

2-1. Execution of the LCA has been selected by the setting operation unit 14.

2-2. The white line at a side corresponding to the turn signal operation direction (white line serving as a boundary between the original lane and the target lane) is a broken line.

2-3. The result of determining whether or not the LCA can be executed based on the monitoring of the surrounding is YES (object (another vehicle or the like) that becomes an obstacle impeding the lane change has not been detected by the surrounding sensors 11, and it is determined that the own vehicle can safely change lanes).

2-4. The road is a road for exclusive use by automobiles (road type information acquired from the navigation ECU 70 represents a road for exclusive use by automobiles).

For example, the condition 2-3 is established when the inter-vehicle distance between the own vehicle and another vehicle that travels in the target lane is appropriately ensured, in consideration of a relative speed therebetween.

The LCA start condition is not limited to the above-mentioned condition, and can be set as appropriate.

When the LCA start condition is not established, the driving support ECU 10 returns the process to Step S15 to repeat the above process. In this manner, the driving support ECU 10 counts the duration time period of shallow pressing operation on the turn signal lever 41 and determines whether or not the LCA start condition is established.

When the LCA start condition is established (S20: Yes), the driving support ECU 10 proceeds the process to Step S21 and sets the steering assist control state to a LCA-ON state. In this manner, the driving support ECU 10 completes the LTA that has been executed and starts the LCA. In other words, when the LCA start condition is established, the driving support ECU 10 accepts the lane change assist request from the driver in Step S20 to start the LCA.

When the driving support ECU 10 starts the LCA, the driving support ECU 10 sounds the buzzer 13 for a short time period to notify the driver of starting the LCA. For example, the driving support ECU 10 may display a screen to notify the driver of starting the LCA on the display unit 31. In this case, the driving support ECU 10 transmits a display command representing the start of LCA to the meter ECU 30. The meter ECU 30 displays the screen to notify the driver of starting the LCA on the display unit 31 in accordance with the display command.

When the driving support ECU 10 starts the LCA, the driving support ECU 10 has the own vehicle move to the target lane after an elapse of a predetermined standby time period from the acceptance of the lane change assist request. In this manner, a state in which the turn signal 32 is being intermittently flashed without a substantial lane change actuation continues for a predetermined time period. The steering control performed during this standby time period is the same as the LTA.

The driving support ECU 10 calculates a target steering angle θlca* and transmits a steering command representing the calculated target steering angle θlca* to the EPS ECU 20 while the driving support ECU 10 is executing the LCA. In this manner, the own vehicle travels along the target trajectory to change lanes.

The driving support determines whether or not an LCA completion condition is established in Step S22 after the start of the LCA.

The LCA completion condition is established when an elapsed time period from the start of the LCA reaches a target lane change time period. The target lane change time period is a time period for which the own vehicle reaches the target lane, in other words, a time period for which the vehicle completes the lane change by a single lane. Therefore, the LCA completion condition implies an LCA completion condition for a single lane change from the original lane to the lane (target lane) immediately adjacent to the original lane. The driving support ECU 10 repeats the determination of Step S22 until the LCA completion condition is established. Thus, when the LCA completion condition is established (S22: Yes), the driving support ECU 10 completes the LCA and tentatively terminates the steering assist control routine. When a predetermined short time period elapses from tentatively terminating the steering assist control routine, the driving support ECU 10 restarts the steering assist control routine. Therefore, when the LTA start condition is established at a timing of restarting of the steering assist control routine, the LTA is restarted. In other words, the LTA instead of the LCA is executed. In this case, in Steps of S14 and S16, the driving support ECU 10 determines whether or not the lane change assist request operation is started. In this manner, when the lane change assist request operation is newly performed (when the shallow pressing operation is performed after the turn signal lever 41 is returned to the neutral position) after completing the LCA corresponding to one lane (LCA for the lane change by a single lane), the LCA toward a next adjacent lane can be restarted.

The driving support ECU 10 determines whether or not a LTA cancel condition set in advance is established while the driving support ECU 10 is executing the LTA (S15-S20). When the LTA cancel condition is established (for example, when the LTA start condition becomes unsatisfied), the driving support ECU 10 may return the process to Step S12. The driving support ECU 10 determines whether or not a LCA cancel condition set in advance is established while the driving support ECU 10 is executing the LCA (S21-S22). When the LCA cancel condition is established (for example, when the LCA start condition becomes unsatisfied), the driving support ECU 10 may return the process to Step S11.

Figure 10:
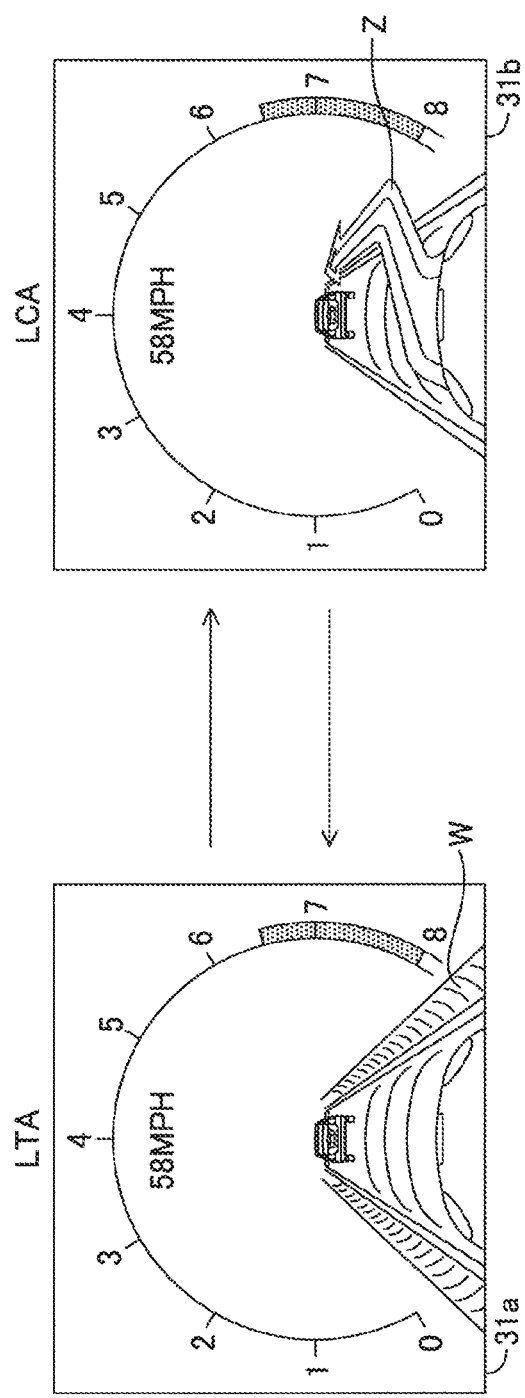
FIG. 10 is a diagram for illustrating a display screen.

FIG. 10 is an illustration of an example of a screen 31a (referred to as "LTA screen 31a") displayed on the display unit 31 while the LTA is being executed and a screen 31b (referred to as "LCA screen 31b") displayed on the display unit 31 while the LCA is being executed. Each of the LTA screen 31a and the LCA screen 31b represents a state in which the own vehicle is traveling in a lane between a left white line and a right white line. Virtual walls W outside the left white line and the right white line are displayed on the LTA screen 31a. The driver can recognize, based on the walls W, a state in which the own vehicle is controlled in such a manner that the own vehicle travels inside the lane. On the other hand, the walls W are not displayed on the LCA screen 31b and a trajectory Z of the LCA instead of the walls W is displayed on the LCA screen 31b. The driving support ECU 10 changes the screens between the LTA screen 31a and the LCA screen 31b in response to an execution state of the steering assist control. In this manner, the driver can easily recognize whether the LTA or the LCA is being executed.

Figure 7:
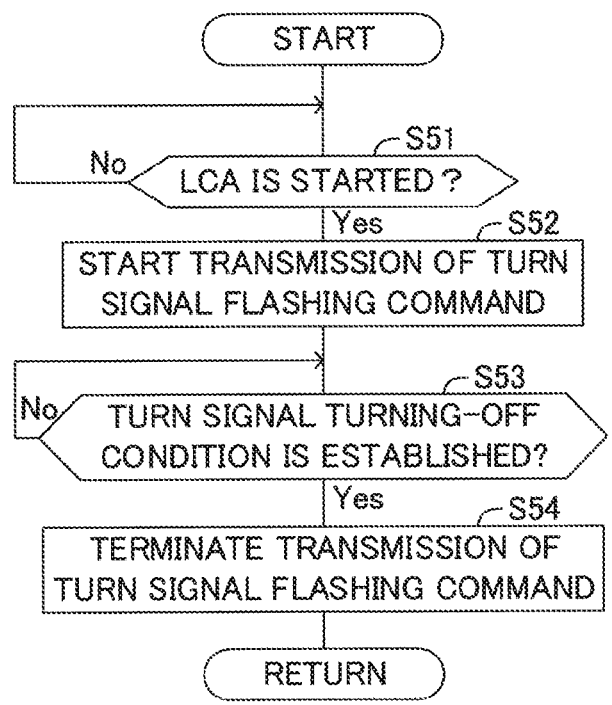
FIG. 7 is a flowchart for illustrating a flashing control of a turn signal of the embodiment.
Figure 8:
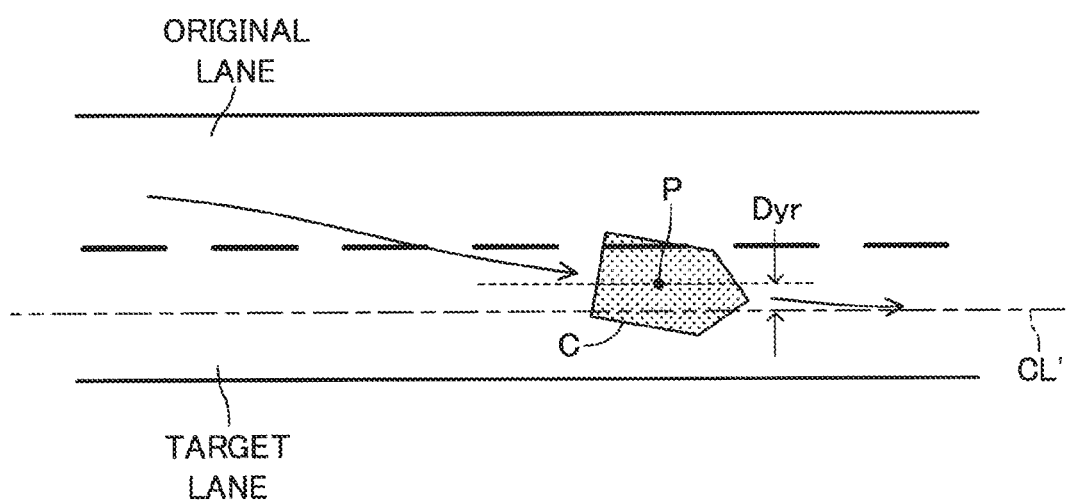
FIG. 8 is a diagram for illustrating a turning-off allowance distance.

The driving support ECU 10 executes a turn signal flashing control routine in parallel with the steering assist control routine. The turn signal flashing control routine executed by the driving support ECU 10 is illustrated in FIG. 7.

When the turn signal flashing control routine is activated, the driving support ECU 10 determines whether or not the LCA has been started in Step S51. In this determination, the driving support ECU 10 only have to determine whether or not the LCA start condition has been established. The deriving support ECU 10 repeats the determination of Step S51 until the LCA is started.

When and after the LCA is started, the driving support ECU 10, in Step S52, starts transmitting the flashing command of the turn signal 32 corresponding to the turn signal operation direction to the meter ECU 30. The intermittently-flashing of the turn signal 32 is started in response to a flashing command which the steering ECU 40 transmits when the shallow pressing operation on the turn signal lever 41 is performed before the LCA is started. Even if (after) the steering ECU 40 stops transmitting the flashing command, the intermittently-flashing of the turn signal 32 continues in response to the flashing command which the driving support ECU 10 transmits in Step S52.

Then, the driving support ECU 10 determines whether or not a turn signal turning-off condition is established in Step S53. The turn signal turning-off condition is established when both of the following conditions 3-1 and 3-2 are established.

3-1. The own vehicle has already crossed the white line.

3-2. The lateral-direction distance between the current position of the own vehicle and the final target lateral position is equal to or smaller than a turning-off allowance distance.

For example, the condition 3-1 is established when it is detected that the reference point P of the own vehicle has crossed the white line (broken line) serving as the boundary between the original lane and the target lane. Further, the condition 3-2 is established when a state is detected in which, as illustrated in FIG. 6, a lateral-direction distance Dyr from the reference point P of the own vehicle C to a lane center line CL' (center line in the width direction) of the target lane becomes equal to or smaller than a turning-off allowance distance Doff that is larger than zero. The lateral-direction distance Dyr is a distance in the lane width direction from the current position of the own vehicle to the final target position, that is, the remaining distance in the lane width direction required until the LCA is completed, and hence this lateral-direction distance Dyr is hereinafter referred to as a "remaining distance Dyr". The driving support ECU 10 calculates, every time a predetermined time (calculation period) elapses, the remaining distance Dyr from the reference point P of the own vehicle to the lane center line CL' of the target lane, and compares the remaining distance Dyr with the turning-off allowance distance Doff, to thereby determine whether or not the above-mentioned condition 3-2 is established. The reference point P used for the determination as to whether or not the condition 3-1 is established is not limited to the position of the center of gravity, and is only required to be a specific position (specific point) of the own vehicle set in advance. Further, in determining whether or not the reference point P crosses the white line, it is only required to determine whether or not the reference point P crosses a line determined in advance, for example, an inner line, an outer line, or a center line of the white line.

The turning-off allowance distance Doff is set to a value (e.g., 50 cm) larger than zero in such a manner that the turn signal 32 is turned-OFF before the LCA is completed.

The driving support ECU 10 repeats the determination of Step S53 until the turn signal turning-off condition is established. When the turn signal turning-off condition is established (S53: Yes), the driving support ECU 10, in Step S54, terminates transmitting the flashing command of the turn signal 32, and tentatively terminates the turn signal flashing control routine. When a predetermined short time period elapses from tentatively terminating the turn signal flashing control routine, the driving support ECU 10 restarts the turn signal flashing control routine.

FIG. 5 is an illustration of an example of the trajectory of the own vehicle when the LCA is executed. At a time t1, the intermittently-flashing of the turn signal 32 is started in response to the shallow pressing operation on the turn signal lever 41. Then, at a time t2 at which the duration time period of the shallow pressing operation reaches the assist request confirmation time period Tref, the driving support ECU 10 detects the lane change assist request. When the LCA start condition is established, the driving support ECU 10 accepts the lane change assist request, starts the LCA, and starts transmitting the flashing command of the turn signal 32 to the meter ECU 30. A standby state to prohibit the own vehicle to perform the lane change actuation continues until the standby time period elapses from the start of the LCA. The steering control performed during this standby time period is the same as the LTA.

The own vehicle starts travelling along the target trajectory at a time t3 when the standby time period elapses. When the own vehicle has crossed the white line and the remaining distance Dyr becomes equal to or smaller than the turning-off allowance distance Doff (time t4), the turn signal is turned-off. Thereafter, when the own vehicle reaches the final target lateral position (time t5), the LCA is completed.

When the lane change assist request is detected and it is determined that the own vehicle can safely change lanes based on a surrounding situation of the own vehicle, the LCA is executed. This causes the driver to overestimate (or put too much trust in) the lane change assist device and/or to fail/omit to monitor the surrounding of the own vehicle by himself/herself. Thus, the driver may wholly leave a determination as to whether to start the lane change assist control to the lane change assist device. For example, the driver may continue to perform the shallow pressing operation on the turn signal lever 41 (that is, the driver may keep the turn signal lever 41 at the first operation position P1L (P1R)), as if the driver reserves the lane change assist. However, when the shallow pressing operation is continued for a long time, a case may arise where a driver's unintended lane change (e.g., additional lane change) is performed. That is, the driver's unintended lane change assist control toward an adjacent lane may be newly started after the own vehicle has completed the lane change.

In view of the above, the lane change assist device according to the present embodiment is configured to:

confirm that the lane change assist request operation on the turn signal lever 41 is not performed (S14);

determine whether or not the lane change assist request operation (the shallow pressing operation) is performed (S16), on the condition that it is confirmed that the lane change assist request operation on the turn signal lever 41 is not performed (S14: Yes).

Further, when the LCA start condition is established under a situation in which it has been detected that the duration time period of the lane change assist request operation is equal to or larger than the assist request confirmation time period Tref, the lane change assist device accepts the lane change assist request to execute the LCA by a single lane (the LCA having the own vehicle change lanes from the original lane to the lane immediately adjacent to the original lane). In addition, the lane change assist device does not accept the new lane change assist request operation during the LCA, because the lane change assist device does not determine whether or not the lane change assist request operation is performed during the LCA (S20-S22).

Therefore, the lane change assist device of this embodiment accepts the lane change assist request only when both of the following conditions are established.

The shallow pressing operation on the turn signal lever 41 is started under a situation in which the shallow pressing operation is not detected and the duration time period of the shallow pressing operation is equal to or larger than the assist request confirmation time period Tref.

The LCA start condition is established.

The lane change assist device is configured not to accept the lane change assist request in response to the shallow pressing operation that is (started to be) performed on the turn signal lever 41 during a time period from the start of the LCA to the completion of the LCA.

In this manner, even if the lane change assist request operation on the turn signal lever 41 is continued (the turn signal lever 41 is operated so as to be kept at the first operation position P1L (P1R)), the LCA is not further (continuously) executed. Thus, the driver has to perform a new lane change assist request operation on the turn signal lever 41 every time the driver wants to receive an assist of the LCA.

If the driver fails to monitor the surrounding of the own vehicle and continues to perform the lane change assist request operation on the turn signal lever 41 as if the driver reserves the further lane change during the execution of the LCA, the LCA to change lanes toward (for) the next adjacent lane is not started. Therefore, the lane change assist device can prevent the driver from performing the lane change assist request operation while the driver overestimates (or puts too much trust in) the lane change assist device.

According to the lane change assist device for a vehicle of this embodiment described above, if the driver continues to perform the lane change assist request operation, the LCA is not executed further, Therefore, according to this embodiment, even when the lane change assist request operation is performed due to the driver's overestimation of the device, the driver's unintended LCA is not started. The lane change assist device can prevent the driver from performing an inappropriate operation due to the driver's overestimation of the lane change assist device. Furthermore, the lane change assist device can prevent the driver from failing to monitor the surrounding of the own vehicle.

In addition, if failures including the following failures occur, the lane change assist device can prevent the LCA from being started. One failure is a failure (a contact point failure) where a contact point of the first switch 411L (411R) is fixed (kept) at a position causing the first switch 411L (411R) to be "on" state under a situation in which the shallow pressing operation is not performed. Another failure is a failure (a communication failure) where the shallow pressing monitoring signal is kept "on" state due to the communication failure.

Further, when the driver desires to change lanes manually, the driver may perform the deep pressing operation on the turn signal lever 41 according to the lane change direction. Thus, the turn signal 32 can be intermittently flashed without starting the lane change assist. Therefore, either one of the automatic lane change and manual lane change can be selected through selecting the operation stroke on the turn signal lever 41. Therefore, very good operability can be obtained. Further, the turn signal lever 41 is used to generate the lane change assist request, and hence a special operation unit for the lane change assist request is unnecessary. Thus, the cost can be reduced, and the space can be saved.

Further, in order for the lane change assist request to be accepted, the shallow pressing operation on the turn signal lever 41 is required to be continued for the assist request confirmation time period Tref or more. Therefore, the driver's intention to receive the lane change assist can be appropriately detected.

<Modification Example of Steering Assist Control Routine>

In the above embodiment, a "condition that the LCA has been completed" is set to be a requisite condition (referred to as a "restart allowable condition") to restart the LCA. In contrast, in this modification example, a "condition that the turn signal 32 is "off" (or has already been turned off)" is set to be the restart allowable condition". The turn signal 32 is turned off immediately before the LCA is completed. In this modification example, the lane change assist request operation performed (started) after the turn signal 32 is turned off is treated as an operation to request a new lane change assist. When the LCA start condition is established under a situation in which the duration time period of the lane change assist request operation which is started after the turn signal 32 is turned off is equal to or larger than the assist request confirmation time period Tref, the LCA is started.

Figure 9:
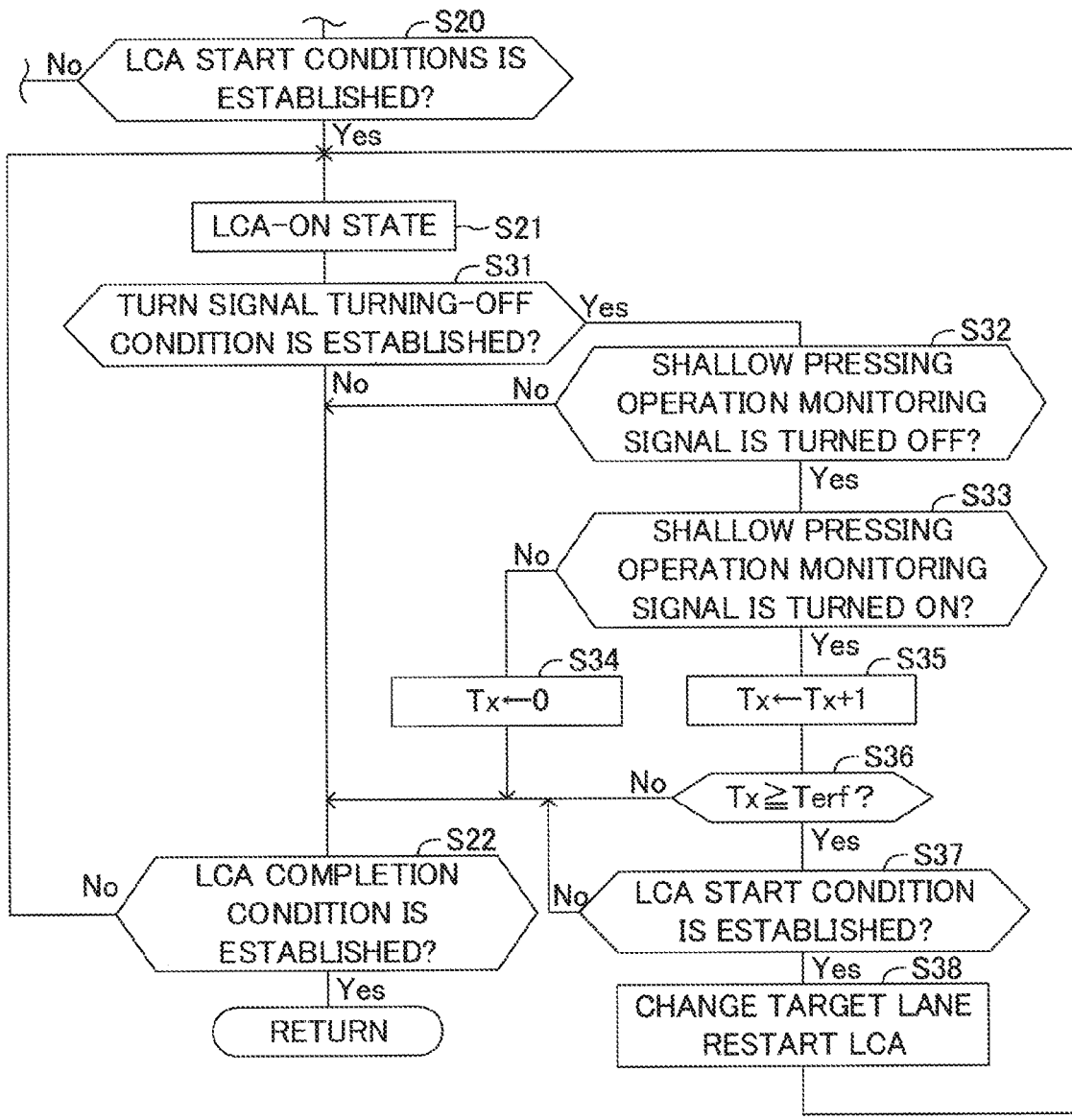
FIG. 9 is a part of a flowchart for illustrating the steering assist control routine of a modification example.

FIG. 9 is a part of a flowchart for illustrating the steering assist control routine of the modification example. The steering assist control routine of the modification example is the same routine as the steering assist control routine of the embodiment (FIG. 6) except that Steps from S31 to Step S38 are added. Only steps after Step S20 (the steps added to the steering assist control routine of the embodiment) are illustrated in FIG. 9 (Step S11-S19 included in the embodiment are omitted). Now, the added steps are described.

When the driving support ECU 10 starts the LCA in Step S21, the driving support ECU 10 determines whether or not the turn signal turning-off condition is established in Step S31. Thus, when the remaining distance Dyr becomes equal to or smaller than the turning-off allowance distance Doff, the driving support ECU 10 makes a "Yes" determination in Step S31. In Step S31, the driving support ECU 10 may determine whether or not the turn signal 32 is turned off, because the turn signal 32 is turned off when the turn signal turning-off condition is established.

The driving support ECU 10 proceeds the process to Step S22 and determines whether or not the LCA completion condition is established while the turn signal turning-off condition is not established. When the turn signal turning-off condition is established, the driving support ECU 10 determines whether or not the shallow pressing operation monitoring signal transmitted from the steering ECU 40 is "off" in Step S32. This determination step is the same as Step S14. When the shallow pressing monitoring signal is not "off", the driving support ECU 10 proceeds the process to Step S22 and determines whether or not the LCA completion condition is established.

The driving support ECU 10 repeats these steps, and when it is detected that the shallow pressing monitoring signal is "off" (S32: Yes) during a time period from the establishment of the turn signal turning-off condition to the establishment of the LCA completion condition, the driving support ECU 10 determines whether or not the shallow pressing monitoring signal is "on" in Step S33. The driving support ECU 10 executes these Step S32 and Step S33 so that the ECU 10 can determine whether or not the lane change assist request operation is performed under the non-operation state of the turn signal lever 41 after the turn signal turning-off condition is established.

When the shallow pressing monitoring signal is not "on" (S33: No), the driving support ECU 10 resets (Tx=0) the timer value Tx for counting the ON duration time period of the shallow pressing operation monitoring signal and proceeds the process to Step S22.

When the shallow pressing operation monitoring signal is turned on (S33: Yes) while these processes are being repeated, the driving support unit 10, in Step S35, increments the timer value Tx by "1". Subsequently, the driving support ECU 10, in Step S36, determines whether or not the timer value Tx is equal to or larger than the assist request confirmation time period Tref.

When the timer value Tx does not reach the assist request confirmation time period Tref (when the duration time period of shallow pressing operation on the turn signal lever 41 by the driver has not reached the assist request confirmation time period Tref), the driving support ECU 10 proceeds the process to Step S22. Therefore, the LTA continues as it is.

While these steps are being repeated, and when the timer value Tx reaches the assist request confirmation time period Tref during the time period from the establishment of the turn signal turning-off condition to the establishment of the LCA completion condition, the driving support ECU 10, in Step 637, determines whether or not the LCA start condition is established. When and after this timer value Tx has reached the assist request confirmation time period, the lane change assist request is detected.

When the LCA start condition is established (637: Yes), the driving support ECU 10, in Step S38, changes target lanes from the current target lane to an lane adjacent to the current target lane in a direction corresponding to an operation direction of the turn signal lever 41. Then, the driving support ECU 10 restarts the LCA toward this newly changed target lane and returns the process to Step S21. Accordingly, the steering assist control state is set to the LCA-ON state in which the target lane is set to the newly changed target lane. The intermittently-flashing of the turn signal 32 is started at this time point. Thus, the LCA restart condition is not established in Step 37 until the turn signal turning-off condition is established.

According to this steering assist control routine of the modification example, the lane change assist request operation performed after the turn signal 32 is turned off is treated as the operation to request the new lane change assist. The driver usually thinks that the LCA is completed when the turn signal is turned off.

Therefore, the lane change assist request in response to a start of the shallow pressing operation on the turn signal lever 41 after the turn signal 32 is turned-off represents the driver's intention to receive the new lane change assist. On the other hand, the shallow pressing operation of the turn signal lever 41 that has been performed since a timing before the turn signal is turned-off may be an operation that the driver has performed in such a manner that the driver reserves the further lane change assist due to putting too much trust in (the driver's overestimation of) the lane change assist device.

In view of the above, in the steering assist control routine of this modification example, the shallow pressing operation which is performed on the turn signal lever 41 during the period from the start of the LCA to the establishment of the turn signal turning-off condition is not accepted as the the lane change assist request. Therefore, the steering assist control routine of this modification example can prevent the driver from overestimating (putting too much trust in the lane change assist device) to perform an inappropriate operation.

Furthermore, it is difficult for the driver to definitely recognize a timing of completing the LCA, but it is possible for the driver to definitely recognize a timing of turning-off the turn signal. Therefore, the driver can appropriately recognize a time point from which the driver can request a next lane change assist control.

In the above, the lane change assist devices for a vehicle according to the embodiment and the modified example have been described, but the present invention is not limited to the above-mentioned embodiment and modified example, and various changes are possible within the range not departing from the object of the present invention.

For example, in the embodiment, the LCA is executed on the requisite condition that the steering assist control state is the LTA-ON state (state in which the LTA is being executed), but such requisite condition is not necessarily required.

In the embodiment, the lane change assist request operation is performed using the turn signal lever 41, but the lane change assist request operation may be performed using an operation unit, provided in addition to the turn signal lever 41, for the lane change assist request operation (for example, an operation unit provided in a pad unit of the steering unit).

In the embodiment, the turn signal 32 is turned off before the completion of the LCA, but the turn signal turning-off condition can be set as appropriate (for example, the turn signal 32 is turned off at the same time as the completion of the LCA).

What is claimed is:

1. A lane change assist device for a vehicle, comprising:
   an operator configured to be operated by a driver when the driver when the driver requests a lane change assist;
   a surrounding monitor for monitoring a surrounding of an own vehicle; and
   a controller configured to:
   detect the lane change assist request from the driver when the operator is operated by the driver;
   accept the lane change assist request to start lane change assist control for changing lanes, when the controller determines that the own vehicle can safely change lanes in which the own vehicle travels under a situation in which the controller has detected the lane change assist request; and
   detect a non-operation state in which the operator is not operated by the driver;
      accept the lane change assist request when a requisite condition is established, the requisite condition being a condition which is set to be established when the controller detects that the operator is operated under a situation in which the contoller has detected the non-operation state;
      execute, when the controller accepts the lane change assist request, the lane change assist control to have the own vehicle change lanes from a current lane in which the own vehicle is currently travelling to a lane immediately adjacent to the current lane; and
      prohibit accepting the lane change assist request during a time from completing the lane change assist control to detecting the non-operation state.

2. The lane change assist device for a vehicle according to claim 1, wherein the controller is further configured to detect the lane change assist request when the operator is operated by the driver for an assist request confirmation period set in advance or more.

3. The lane change assist device for a vehicle according to claim 1, wherein the controller is further configured not to accept the lane change assist request, even when the contoller detects the operator is operated the driver during a period from the start of the lane change assist control to a completion of the lane change assist control.

4. The lane change assist device for a vehicle according to claim 1, wherein the controller is further configured to:
   control an actuation of a turn signal to start to intermittently flash the turn signal when the lane change assist control is started and to turn-off the turn signal when a turn signal turning-off condition which is set to be established before a completion of the lane change assist control is established,
   accept the lane change assist request, even when the controller detects the operator is operated by the driver to request the lane change assist during a period from the start of the lane change assist control to the establishment of the turn signal turning-off condition.

* * * * *